US006827188B2

(12) United States Patent
Patridge

(10) Patent No.: US 6,827,188 B2
(45) Date of Patent: Dec. 7, 2004

(54) MULTIPLE DISK CLUTCH/BRAKE ASSEMBLY

(76) Inventor: Arthur G. Patridge, 148 Valley Oaks Dr., Advance, NC (US) 27006

( * ) Notice: Subject to any disclaimer, the term of this patent is extended or adjusted under 35 U.S.C. 154(b) by 0 days.

(21) Appl. No.: 10/356,963

(22) Filed: Feb. 3, 2003

(65) Prior Publication Data

US 2004/0069585 A1 Apr. 15, 2004

Related U.S. Application Data

(63) Continuation-in-part of application No. 10/272,456, filed on Oct. 15, 2002, now Pat. No. 6,705,442.

(51) Int. Cl.[7] .............................................. F16D 67/02
(52) U.S. Cl. ........................ 192/15; 192/18 R; 56/11.3
(58) Field of Search ................................ 192/15, 18 R; 56/11.3

(56) References Cited

U.S. PATENT DOCUMENTS

| | | | |
|---|---|---|---|
| 2,378,117 A | 6/1945 | Whiting | |
| 4,141,439 A | 2/1979 | Lunde et al. | |
| 4,205,509 A | 6/1980 | Miyazawa et al. | |
| 4,213,521 A | 7/1980 | Modersohn | |
| 4,226,313 A | * 10/1980 | Meldahl et al. | ........... 192/18 R |
| 4,286,701 A | 9/1981 | MacDonald | |
| 4,313,293 A | * 2/1982 | Nagai | .......................... 56/11.3 |
| 4,352,266 A | 10/1982 | Lloyd et al. | ................. 56/11.3 |
| 4,372,433 A | 2/1983 | Mitchell et al. | |
| 4,377,224 A | 3/1983 | Takata et al. | |
| 4,388,988 A | 6/1983 | MacDonald | ........... 192/12 BA |
| 4,511,023 A | * 4/1985 | Nagai | ........................ 192/18 R |
| 4,524,853 A | 6/1985 | Nagai | |
| 4,538,712 A | 9/1985 | Nagai | |
| 4,730,710 A | 3/1988 | Granitz | ..................... 192/18 R |
| 5,033,595 A | 7/1991 | Pardee | |
| 5,549,186 A | * 8/1996 | Pardee | ..................... 192/18 R |
| 5,570,765 A | 11/1996 | Patridge | |
| 5,749,208 A | 5/1998 | Wuebbels et al. | |
| 6,397,992 B1 | 6/2002 | Patridge | |

* cited by examiner

Primary Examiner—Charles A. Marmor
Assistant Examiner—Eric M. Williams
(74) Attorney, Agent, or Firm—Michael Best & Friedrich, LLP

(57) ABSTRACT

A clutch/brake assembly including a first housing shell having a braking surface, an input shaft coupled to the first housing shell for rotation relative to the first housing shell, at least two input disks coupled to the input shaft for co-rotation with the shaft, the input disks being movable along the shaft, a braking disk having a first friction surface and a second friction surface, the braking disk being movable along the shaft, a biasing member biasing the braking disk against the braking surface of the first housing shell to resist rotation of the braking disk relative to the first housing shell, a second housing shell coupled to the input shaft for rotation relative to the input shaft and the first housing shell, the second housing shell having a third friction surface, and an actuator assembly operable to disengage the braking disk from the braking surface and operable to drivingly engage the first, second, and third friction surfaces with the input disks.

45 Claims, 22 Drawing Sheets

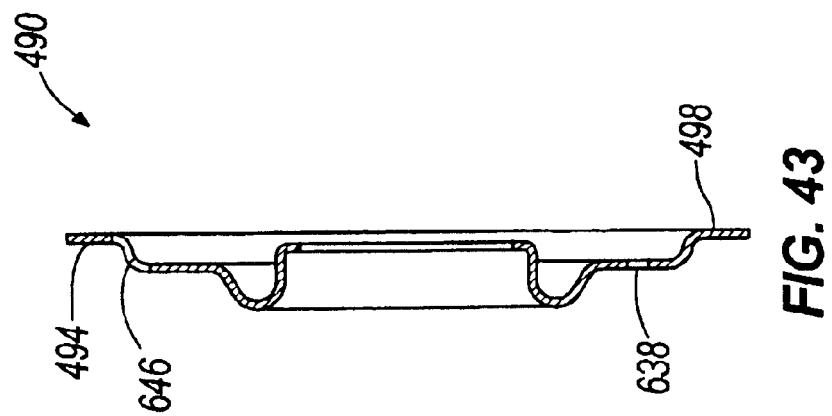
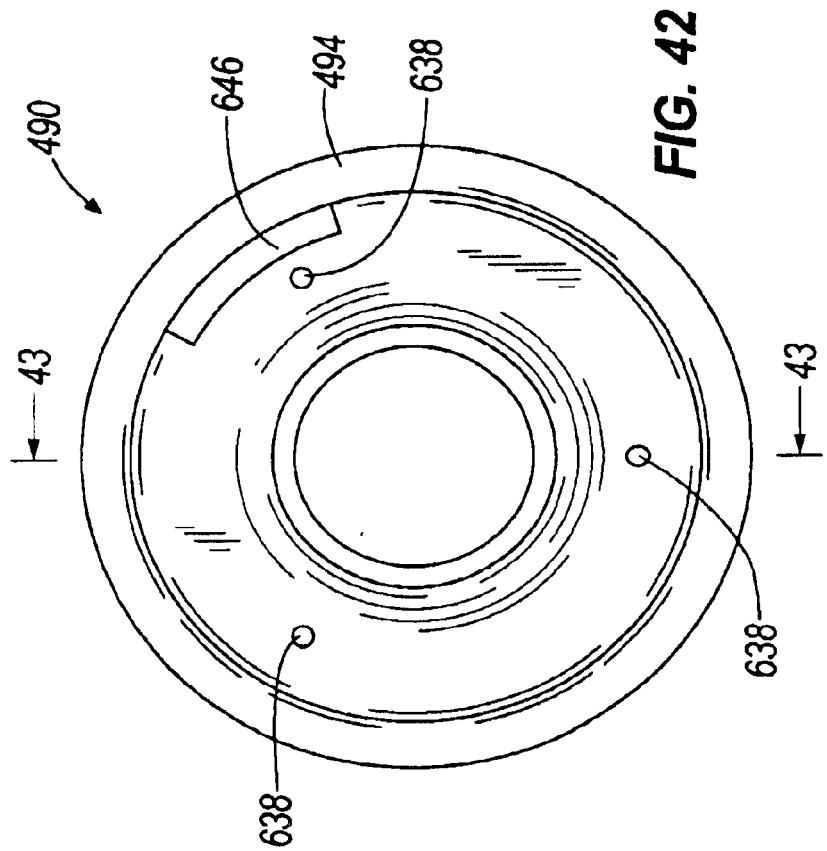
FIG. 43
FIG. 42

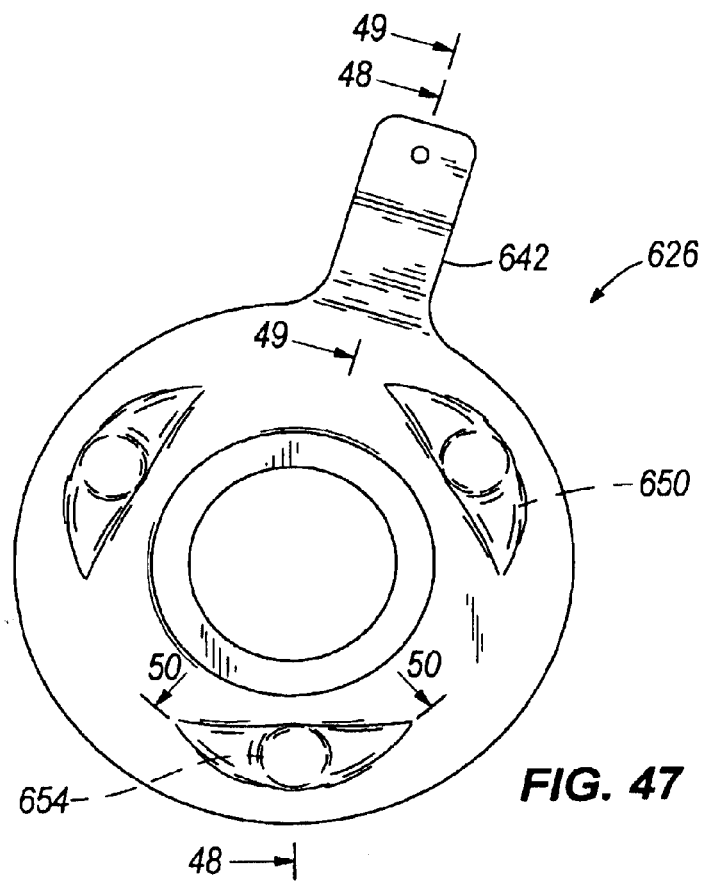
FIG. 47
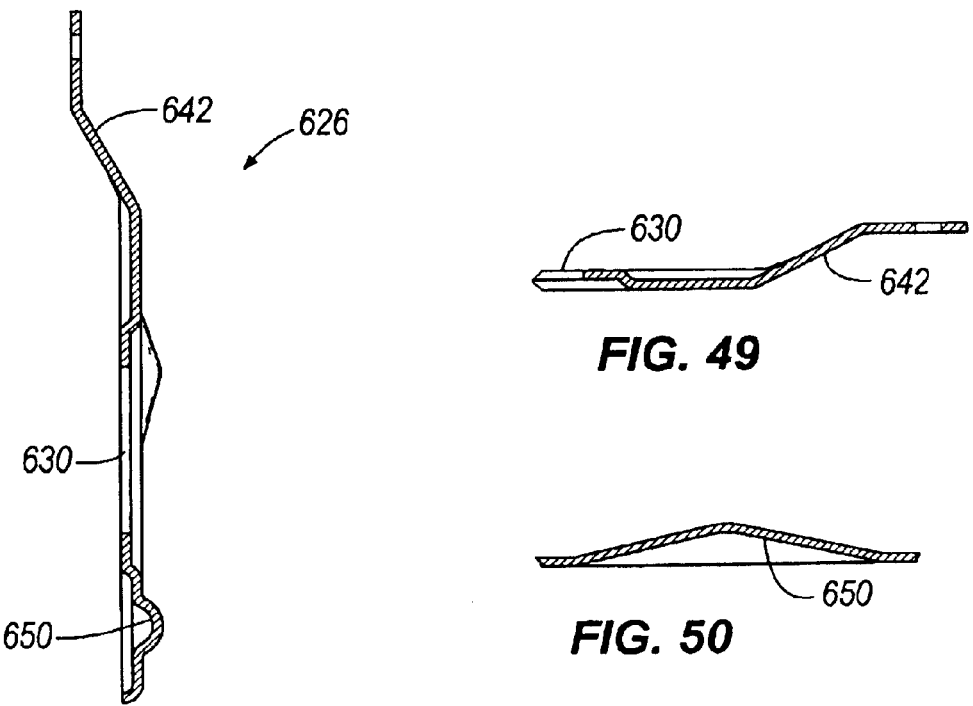
FIG. 49
FIG. 50
FIG. 48

MULTIPLE DISK CLUTCH/BRAKE ASSEMBLY

RELATED APPLICATIONS

This is a continuation-in-part patent application of co-pending U.S. patent application Ser. No. 10/272,456 filed on Oct. 15, 2002, now U.S. Pat. No. 6,705,442, which is incorporated herein by reference.

FIELD OF THE INVENTION

The invention relates to a clutch/brake assembly for use on a lawnmower or other powered equipment.

BACKGROUND OF THE INVENTION

Clutch/brake assemblies of the type described herein are commonly used on devices such as riding lawnmowers and small tractors. The clutch/brake assembly allows the user to selectively engage the clutch to drive auxiliary equipment such as a lawnmower blade, snowblower screw, etc. In addition, the clutch/brake assembly provides a brake mechanism that stops the rotation of the auxiliary equipment when the user disengages the clutch. Thus, the clutch gives the user full control of the rotation of the auxiliary equipment.

Due to the limited size of lawn tractors and riding lawnmowers, the mechanical components such as the clutch/brake assembly and the engine are made as small as possible. However, the clutch mechanism must be large enough to efficiently transfer the engine power to the blade or other driven accessory without wearing excessively or failing.

SUMMARY OF THE INVENTION

The present invention provides a clutch/brake assembly including a plurality of disks that engage each other to transfer the rotation of a drive shaft to a driven shaft and an associated output pulley.

More particularly, the present invention provides a clutch/brake assembly including a first housing shell having a braking surface, an input shaft coupled to the first housing shell for rotation relative to the first housing shell, at least two input disks coupled to the input shaft for co-rotation with the shaft, the input disks being movable along the shaft, a braking disk having a first friction surface and a second friction surface, the braking disk being movable along the shaft, a biasing member biasing the braking disk against the braking surface of the first housing shell such that the braking disk resists rotation relative to the first housing shell, a second housing shell coupled to the input shaft for rotation relative to the input shaft and the first housing shell, the second housing shell having a third friction surface, and an actuator assembly operable to disengage the braking disk from the braking surface and operable to drivingly engage the first, second, and third friction surfaces with the input disks.

The present invention also provides a clutch/brake assembly including a first housing shell having a braking surface, an input shaft coupled to the first housing shell for rotation relative to the first housing shell, a second housing shell coupled to the input shaft for rotation relative to the input shaft and the first housing shell, at least two input disks coupled to the input shaft for co-rotation with the input shaft, the input disks being movable along the input shaft between a braking position and a driving position, a braking disk coupled to the second housing shell for co-rotation with the second housing shell, the braking disk being movable along the input shaft between the braking position and the driving position, a biasing member biasing the braking disk against the braking surface of the first housing shell such that the braking disk resists rotation relative to the first housing shell when the braking disk is in the braking position, and an actuator assembly operable to disengage the braking disk from the braking surface of the first housing shell and engage the input disks with the braking disk into the driving position for co-rotation therebetween.

Further, the present invention provides a clutch/brake assembly including a first housing shell having a first braking surface, an input shaft coupled to the first housing shell for rotation relative to the first housing shell, a first output device coupled to the input shaft for rotation with the input shaft, a second output device coupled to the input shaft for rotation relative to the input shaft, at least two input disks coupled to the input shaft for co-rotation therewith, the input disks being axially movable along the input shaft. The clutch/brake assembly also includes a braking disk having a second braking surface engageable with the first braking surface, a first friction surface, and a second friction surface opposite the first friction surface, the braking disk being movable along the input shaft. Further, the clutch/brake assembly includes a second housing shell coupled to the input shaft for rotation relative to the input shaft and the first housing shell, the second housing shell inter-engaging the braking disk for co-rotation therewith, the second housing shell having a third friction surface, a biasing member biasing the second braking surface against the first braking surface such that the braking disk resists rotation relative to the first housing shell, and an actuator assembly operable to overcome the biasing member to disengage the first braking surface from the second braking surface and drivingly engage the first, second, and third friction surfaces with the input disks to cause rotation of the second housing shell and the second output device.

The present invention also provides a clutch/brake assembly including a housing having a first braking surface, an input shaft coupled to the housing for rotation relative to the housing, at least two input disks coupled to the input shaft for co-rotation with the shaft, the input disks being movable along the shaft, a braking disk having a second braking surface, the braking disk being movable along the shaft, a biasing member biasing the second braking surface against the first braking surface such that the braking disk resists rotation relative to the housing, an output disk coupled to the input shaft for rotation relative to the input shaft and the housing, at least one of the input disks being engageable with the output disk, and an actuator assembly operable to disengage the first and second braking surfaces and operable to drivingly engage the at least one input disk with the output disk.

Other features of the invention will become apparent to those skilled in the art upon review of the following detailed description and drawings.

BRIEF DESCRIPTION OF THE DRAWING

FIG. 42 is a top view of a housing of the assembly of FIG. 38.

FIG. 43 is a cross-sectional view of the housing of FIG. 42 taken along line 43—43.

FIG. 47 is a top view of a bottom plate of the assembly of FIG. 38.

FIG. 48 is a cross-sectional view of the top plate of FIG. 47 taken along line 48—48.

FIG. 49 is a cross-sectional view of the top plate of FIG. 47 taken along line 49—49.

FIG. 50 is a cross-sectional view of the top plate of FIG. 47 taken along line 50—50.

Figure 1:
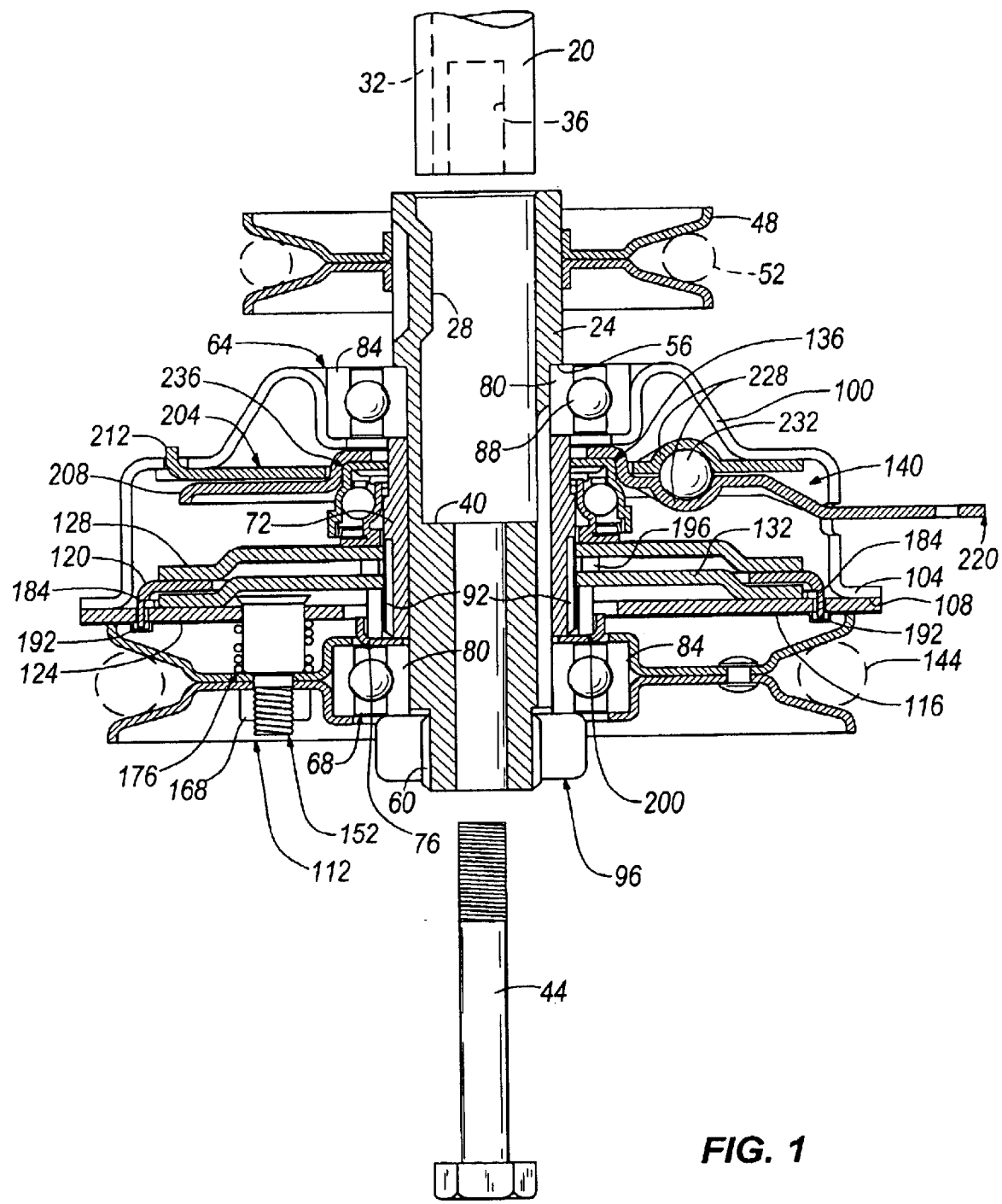
FIG. 1 is a cross-sectional view of a clutch/brake assembly embodying the invention.

Before at least one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Reference is made to a prior art clutch/brake assembly disclosed in U.S. Pat. No. 5,570,765, and invented by the present inventor. The entire contents of U.S. Pat. No. 5,570,765 are incorporated herein by reference.

FIG. 1 illustrates a portion of a drive system for a powered implement or vehicle (not shown), such as a riding lawnmower. Although the invention is discussed below with respect to the illustrated embodiment, the invention may be embodied in other implements, and should not be regarded as limited to a riding lawnmower application.

The vehicle includes an internal combustion engine which is mounted to a riding lawnmower chassis. The engine could alternatively be an electric engine in some applications. The engine includes (FIG. 1) an output shaft 20 that extends down from the chassis and extends into an inner hub 24. The outer surface of the inner hub 24 is stamped to provide an indent or key 28 that extends inwardly of the inner hub 24. The output shaft 20 includes a keyway 32 (shown in phantom in FIG. 1) that engages the key 28 to afford common rotation of the output shaft 20 with the inner hub 24. The distal end of the output shaft 20 includes a threaded bore 36. The output shaft 20 is tightened against an inner shoulder 40 in the inner hub 24 by a bolt 44 that is threaded into the threaded bore 36. The head of the bolt 44 bears against the bottom surface of the inner hub 24.

Figure 2:
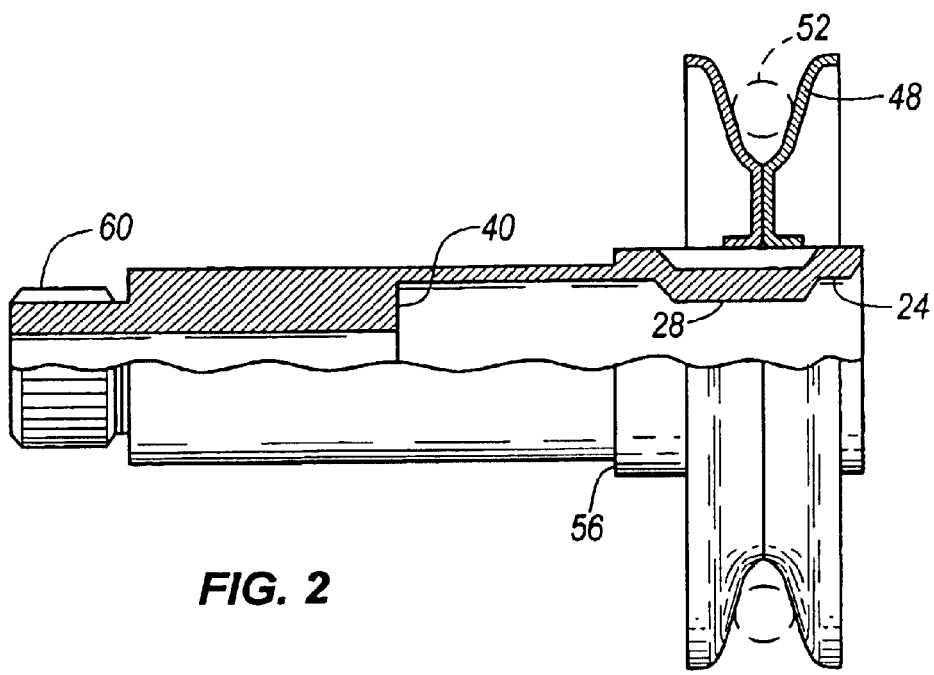
FIG. 2 is a partial cross-sectional view of the inner hub and transaxle pulley portion of the assembly.

As shown in FIGS. 1 and 2, a transaxle pulley 48 is welded to the outer surface of the inner hub 24, and rotates in common with the inner hub 24 and the output shaft 20. The transaxle pulley 48 engages a drive belt 52 that is operably driven by the transmission (not shown) of the riding lawnmower or other power equipment to which the engine is mounted.

Figure 3:
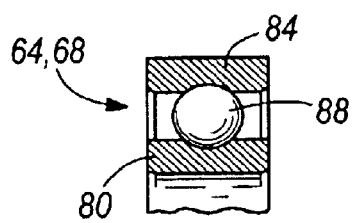
FIG. 3 is a partial view of a bearing of the assembly.
Figure 4:
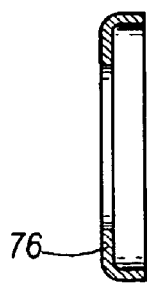
FIG. 4 is a cross-sectional view of the cup-shaped washer of the assembly taken along line 4—4 of FIG. 5.
Figure 5:
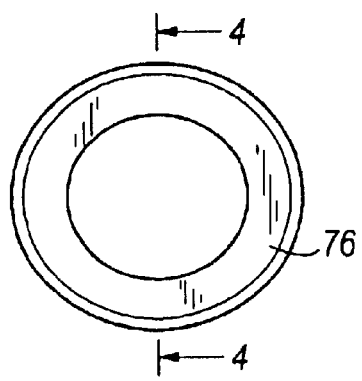
FIG. 5 is a top view of the cup-shaped washer.

The inner hub 24 also includes an outer downwardly-facing shoulder 56 and a threaded lower end 60. Between the outer shoulder 56 and the threaded lower end 60 are upper and lower bearings 64, 68 (FIG. 3), a splined collar 72, and a cup-shaped washer 76 (FIGS. 4 and 5). The upper and lower bearings 64, 68 each include an inner race 80 and an outer race 84 separated by balls 88, and the splined collar 72 includes a lower portion that has splines 92. A nut 96 is threaded onto the threaded lower end 60 of the inner hub 24 to capture the splined collar 72 and the cup-shaped washer 76 between the inner races 80 of the upper and lower bearings 64, 68. Tightening the nut 96 causes a frictional engagement between the inner races 80 of the upper and lower bearings 64, 68, the splined collar 72, the cup-shaped washer 76, and the inner hub 24, such that those parts rotate in common. Alternatively, a shaft including an integral splined section could be used. The terms "outside", "top", "bottom", "under", "over", "upper", "lower" and the like, as used herein and in the appended claims, are for purposes of description only and are not intended to imply any particular orientation. For example, the clutch/brake assembly 10 may be oriented in any particular direction since the components of the assembly 10 operate independent from the influence of gravity.

Figure 8:
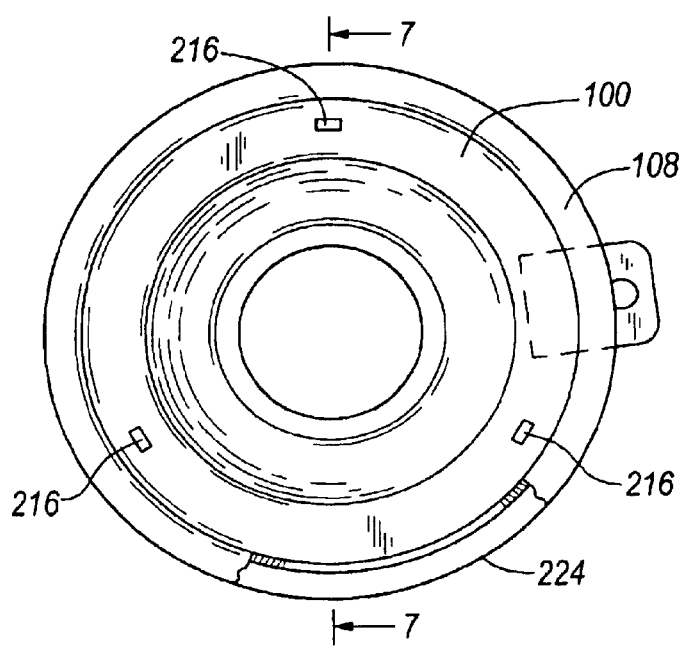
FIG. 8 is a bottom view of the housing of the assembly.
Figure 7:
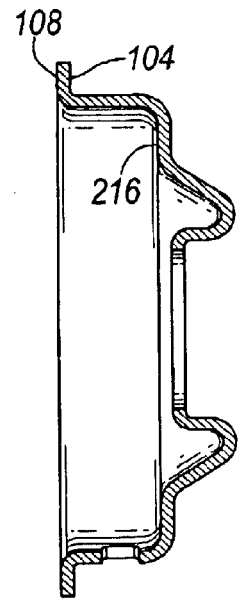
FIG. 7 is a cross-sectional view taken along line 7—7 in FIG. 8.
Figure 6:
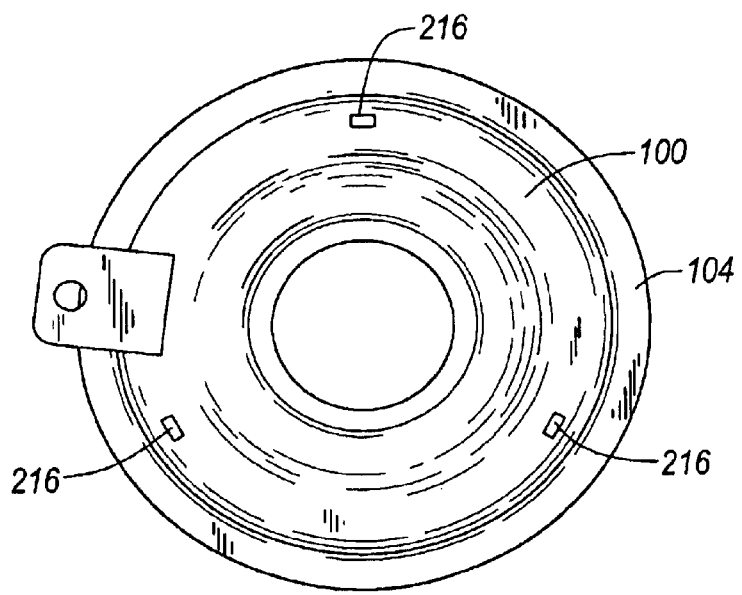
FIG. 6 is a top view of the housing of the assembly.
Figure 9:
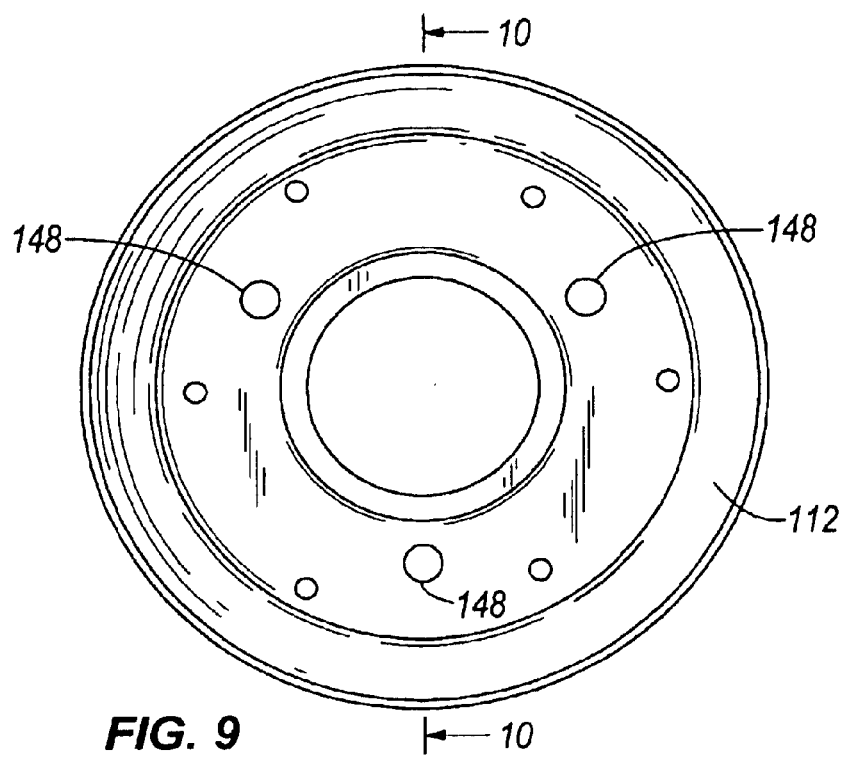
FIG. 9 is a top view of half of the output pulley.
Figure 10:
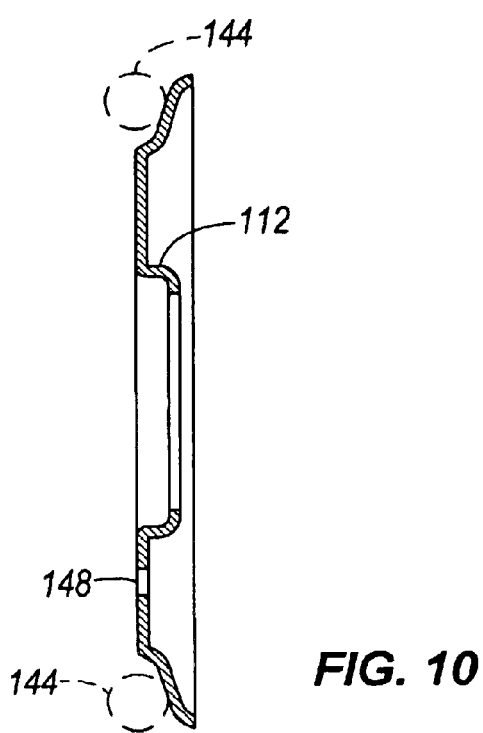
FIG. 10 is a cross-sectional view taken along line 10—10 in FIG. 9.
Figure 11:
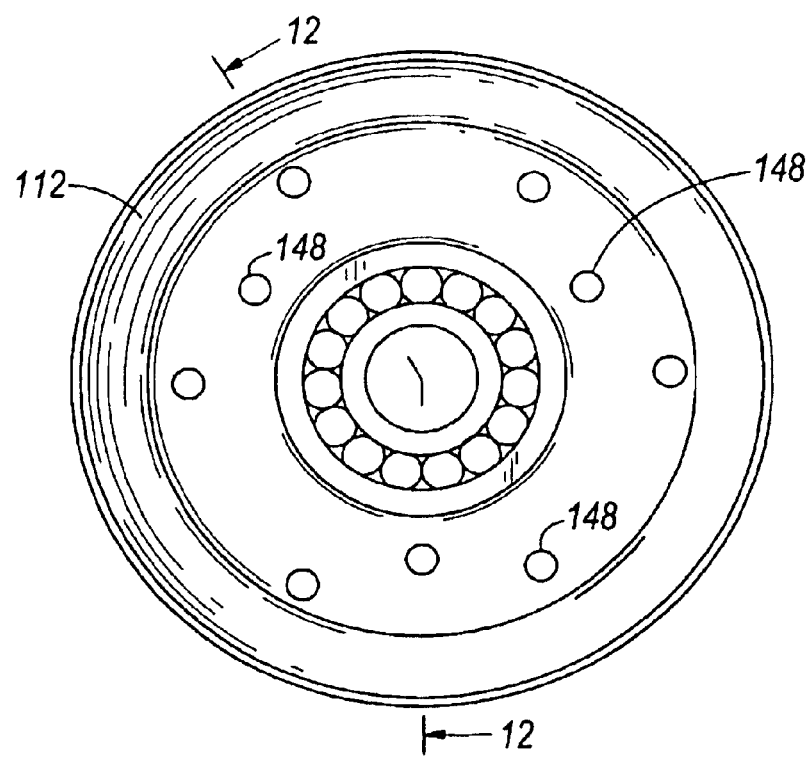
FIG. 11 is a top view of the output pulley assembly.
Figure 12:
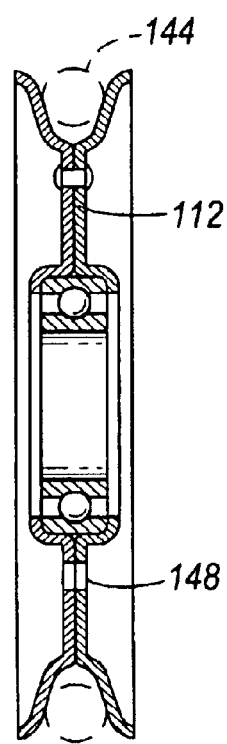
FIG. 12 is a cross-sectional view of the output pulley assembly taken along line 12—12 in FIG. 11.
Figure 13:
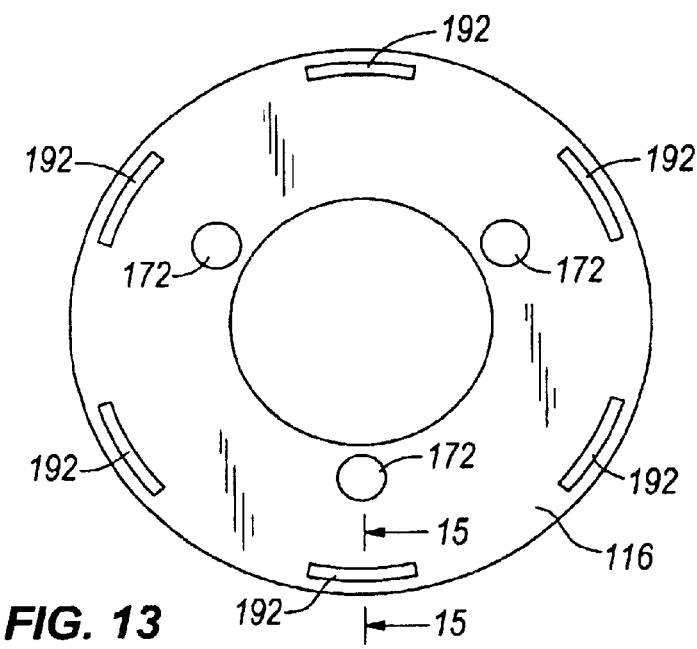
FIG. 13 is a top view of the support plate of the assembly.
Figure 14:
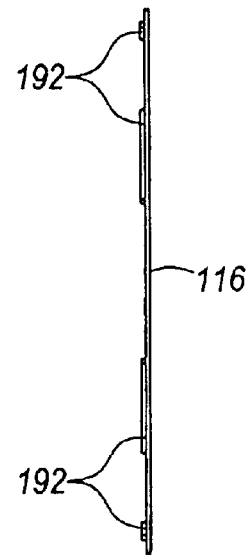
FIG. 14 is a side view of the support plate.
Figure 15:
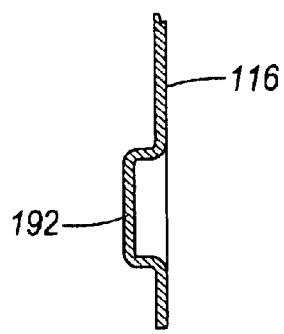
FIG. 15 is an enlarged cross-sectional view of the portion of the support plate taken along line 15—15 in FIG. 13.
Figure 16:
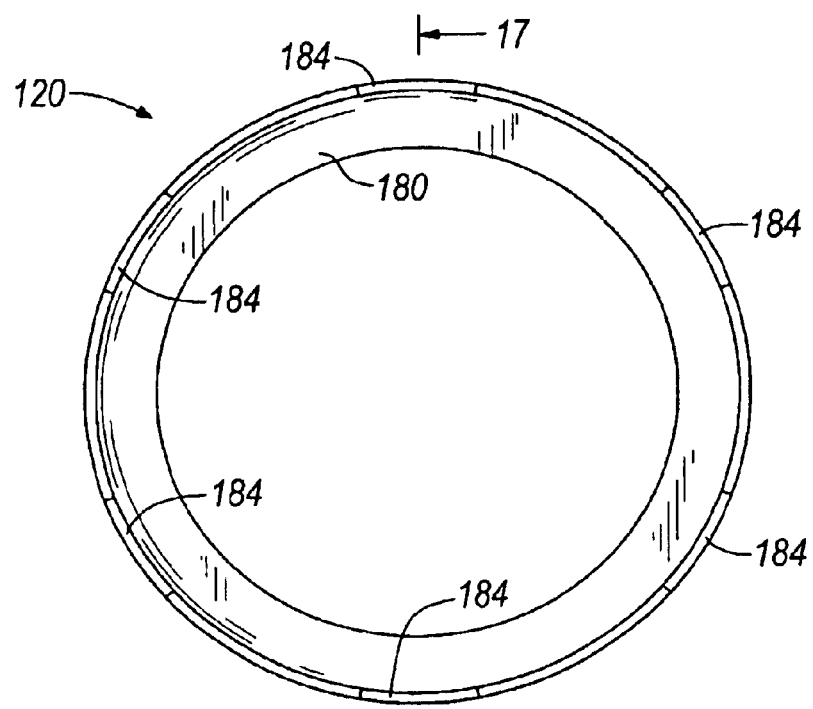
FIG. 16 is a bottom view of an upper output disk of the assembly.
Figure 17:
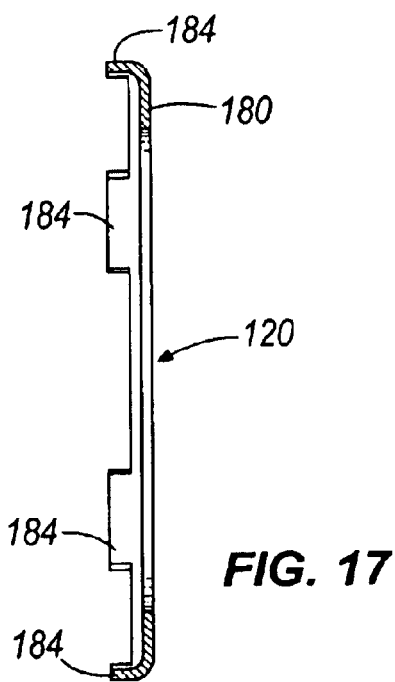
FIG. 17 is a cross-sectional view of the upper output disk taken along line 17—17 in FIG. 16.
Figure 18:
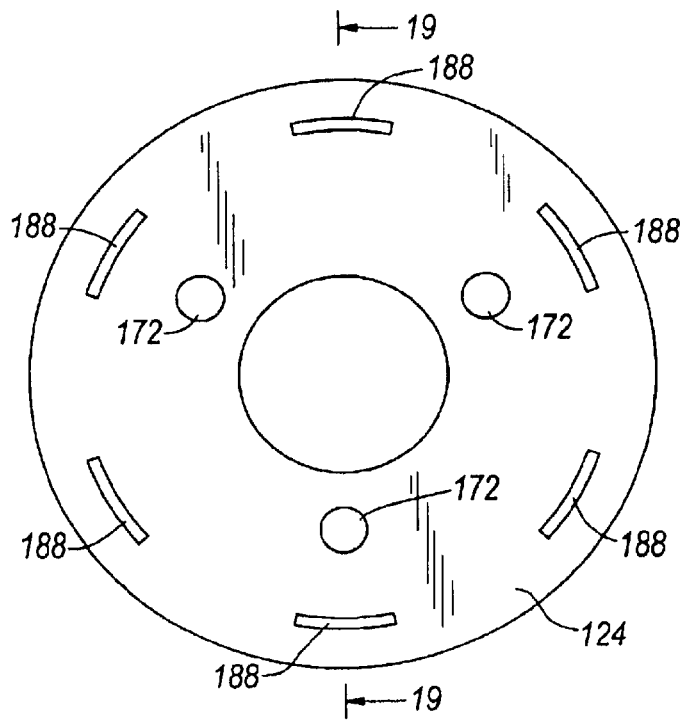
FIG. 18 is a top view of a lower output disk of the assembly.
Figure 19:
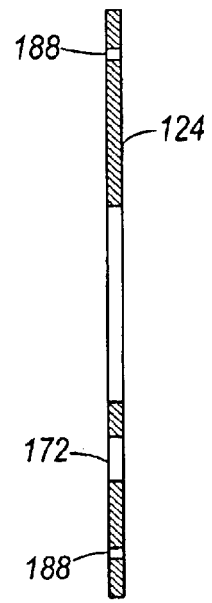
FIG. 19 is a cross-sectional view of the lower output disk taken along line 19—19 in FIG. 18.
Figure 20:
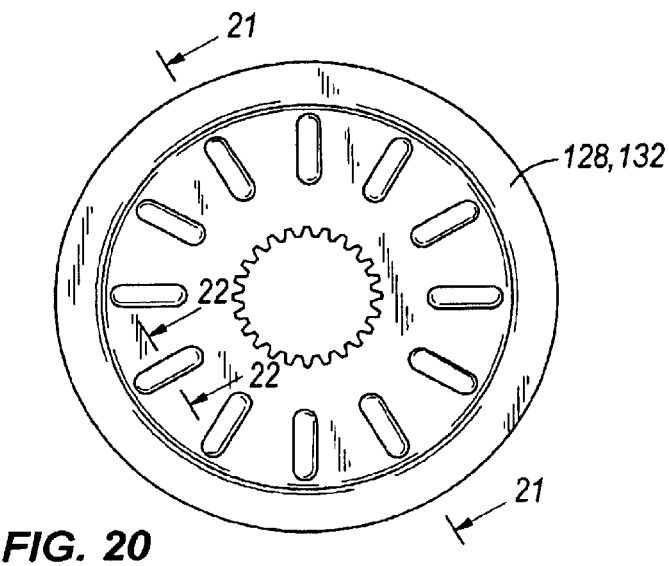
FIG. 20 is a top view of an input disk of the assembly.
Figure 21:
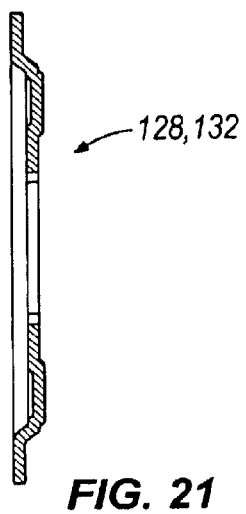
FIG. 21 is a cross-sectional view of the input disk taken along line 21—21 in FIG. 20.
Figure 22:
FIG. 22 is a cross-sectional view taken along line 22—22 in FIG. 20.
Figure 24:
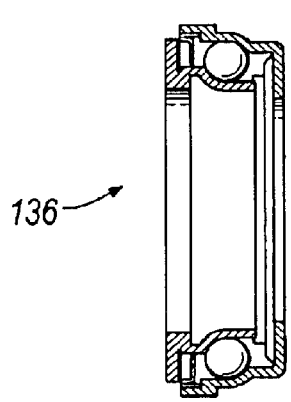
FIG. 24 is a cross-sectional view of the thrust bearing taken along line 24—24 in FIG. 23.
Figure 23:
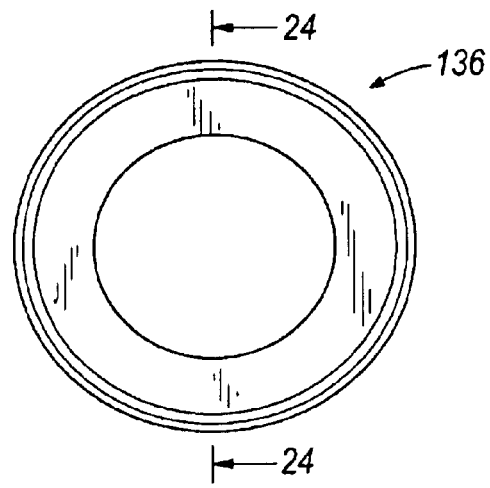
FIG. 23 is a top view of a thrust bearing of the assembly.

A housing 100 (FIGS. 6–8) is affixed to the outer race 84 of the upper bearing 64. The housing 100 extends radially from the upper bearing 64, and includes a lower flange portion 104 that provides a downwardly-facing braking surface 108. Below the housing 100 is an output pulley 112 (FIGS. 9–12), a support plate 116 (FIGS. 13–15), upper and lower output disks 120, 124 (FIGS. 16–19), upper and lower input disks 128, 132 (FIGS. 20–22), a thrust bearing 136 (FIGS. 23 and 24), and an actuator assembly 140.

The output pulley 112 is affixed to the outer race 84 of the lower bearing 68, and receives a drive belt 144. The drive belt 144 is interconnected with pulleys (not shown) that are interconnected to working shafts, such as blade shafts (also not shown) having cutting blades attached thereto. The blade shafts are generally vertically-oriented, and are generally parallel to the output shaft 20 of the engine. When rotated, the blade shafts cause the blades to rotate and cut the grass over which the riding lawnmower is traveling. In an alternative construction, the output pulley 112 may be replaced with a shaft coupling that couples a blade shaft to the lower output disk 124 to drive the blade shaft directly without the drive belt 144.

Figure 25:
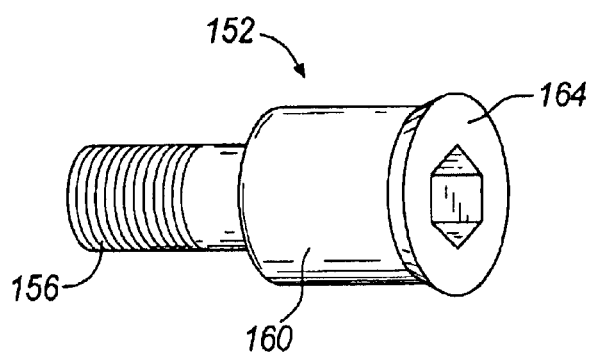
FIG. 25 is a perspective view of a drive stud of the assembly.

The output pulley 112 has extending therein three holes 148 that receive drive studs 152 (FIG. 25). Each drive stud 152 includes a threaded shank 156, an increased diameter smooth portion 160, and a flared top 164. Nuts 168 are threaded onto the threaded shanks 156 to sandwich the output pulley 112 between the nuts 168 and the increased diameter portions 160 of the studs 152. The support plate 116 and lower output disk 124 include holes 172 (FIGS. 13, 18, and 19) in alignment with the holes 148 in the output pulley 112. The increased diameter portions 160 of the drive studs 152 extend through the holes 172 in the support plate 116 and lower output disk 124. The output pulley 112, support plate 116, and lower output disk 124 are coupled for rotation together by the drive studs 152. Braking springs 176 surround the increased diameter portions 160 of the drive studs 152 and bias the support plate 116 and lower output disk 124 upwardly. The flared ends 164 of the drive studs 152 prevent the support plate 116 and lower output disk 124 from sliding off the top of the drive studs 152.

Figure 37:
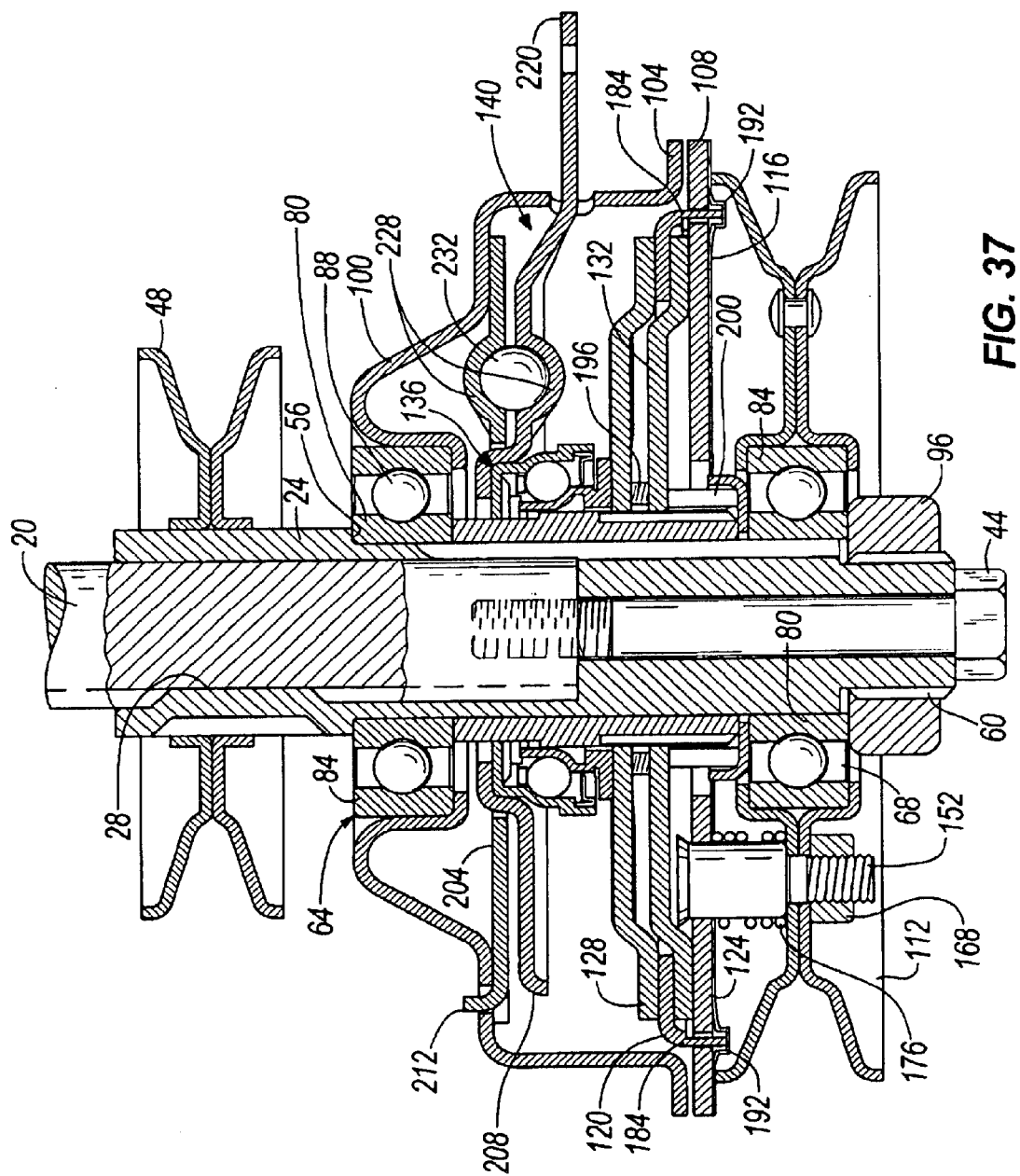
FIG. 37 is a cross-sectional view of the clutch/brake assembly of FIG. 1 in the driving position.

The upper output disk 120 (FIGS. 16 and 17) includes a substantially horizontal portion 180 and six depending tabs 184 extending substantially vertically down from the horizontal portion 180. The tabs 184 extend through corresponding slots 188 in the lower output disk 124 (FIGS. 18 and 19), and are received in corresponding pockets 192 (FIGS. 13–15) in the support plate 116. The upper output disk 120 is thereby coupled for rotation with the lower output disk 124 by virtue of the engagement between the tab 184 and slot 188, and is supported by the support plate pockets 192. The support plate 116 is preferably constructed of relatively thin material and acts as a resilient diaphragm or spring plate. More specifically, the support plate 116 is deflectable under the influence of a force acting on the upper output disk 120 (as shown in FIG. 37), and will return to an undeflected position illustrated in FIG. 1 once the force is removed.

Figure 27:
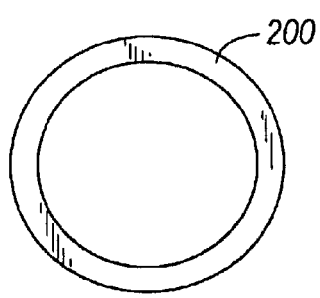
FIG. 27 is a top view of a support spring of the assembly.
Figure 26:
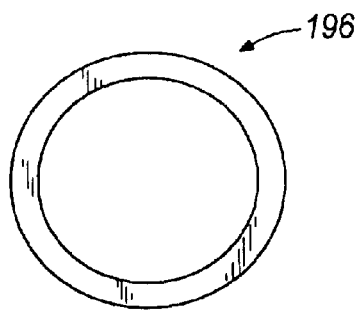
FIG. 26 is a top view of a separator spring of the assembly.
Figure 28:
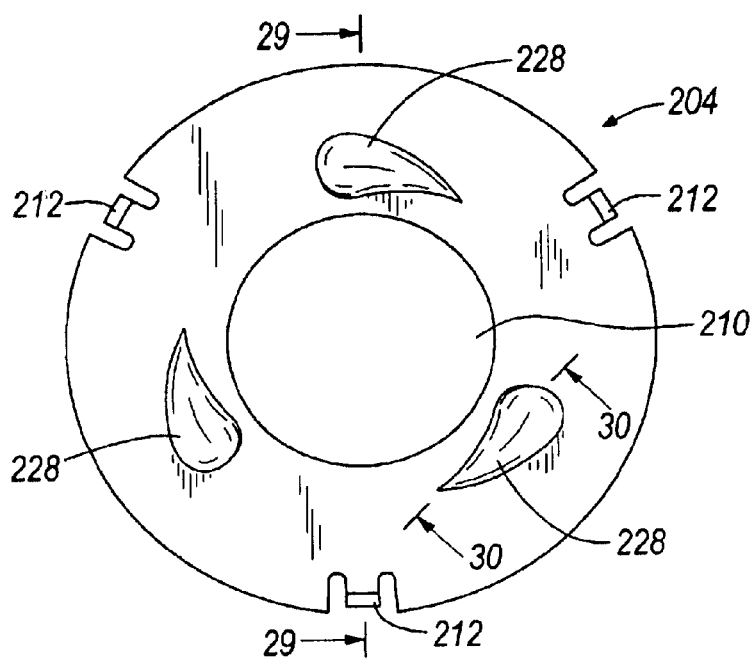
FIG. 28 is a top view of a top plate of the actuator assembly.
Figure 29:
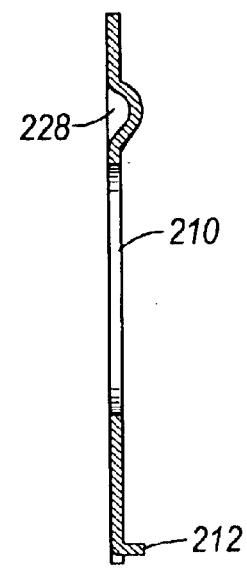
FIG. 29 is a cross-sectional view taken along line 29—29 in FIG. 28.
Figure 30:
FIG. 30 is a cross-sectional view taken along line 30—30 in FIG. 28.
Figure 31:
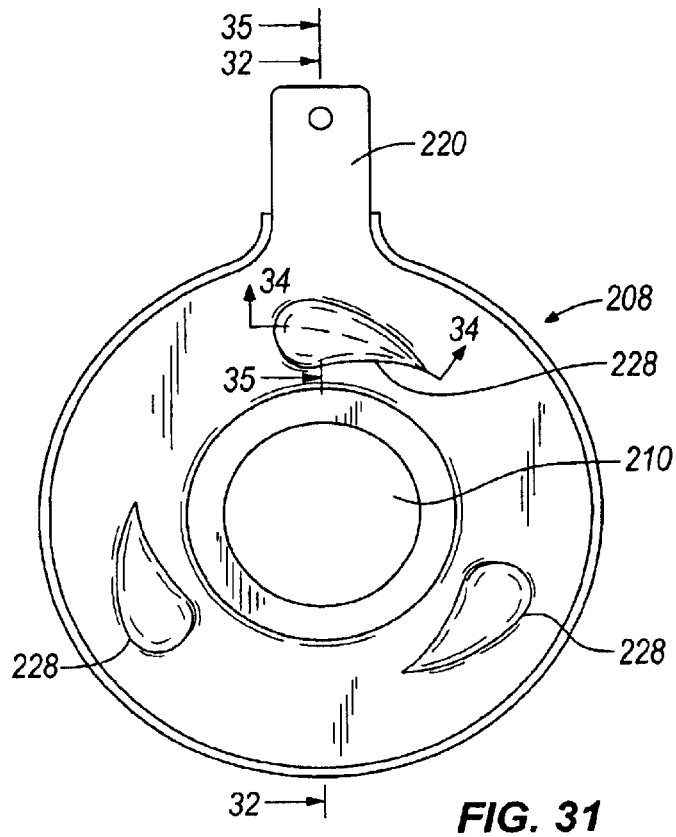
FIG. 31 is a bottom view of a bottom plate of the actuator assembly.
Figure 32:
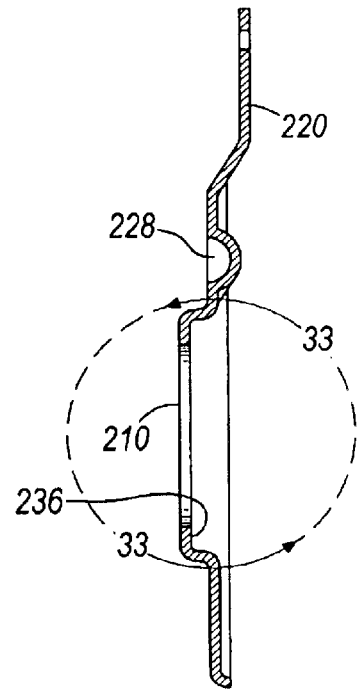
FIG. 32 is a cross-sectional view taken along line 32—32 in FIG. 31.
Figure 33:
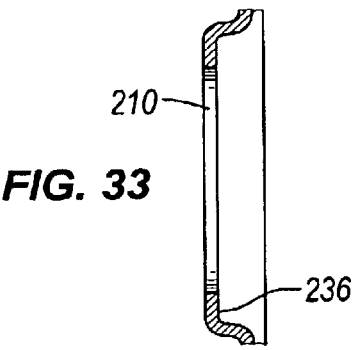
FIG. 33 is an enlarged view of the portion encircled in FIG. 32.
Figure 36:
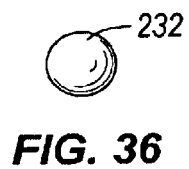
FIG. 36 is a side view of an actuator ball of the actuator assembly.
Figure 34:
FIG. 34 is a cross-sectional view taken along line 34—34 in FIG. 31.
Figure 35:
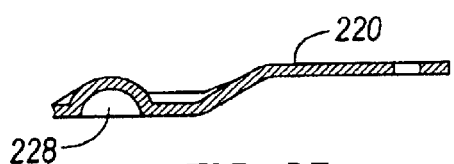
FIG. 35 is a cross-sectional view taken along line 35—35 in FIG. 31.

The upper and lower input disks 128, 132 are interconnected to the splined collar 72 by virtue of the splines 92. The splined interconnection causes the input disks 128, 132 to be rotationally fixed relative to the splined collar 72, but affords axial movement of the input disks 128, 132 along the splines 92. A separator spring 196 (FIG. 26) is interposed between the input disks 128, 132 to maintain separation therebetween, and a support spring 200 (FIG. 27) is interposed between the cup-shaped washer 76 and the lower input disk 132 to support the input disks 128, 132. The separator spring 196 and support spring 200 are preferably wave springs, but may alternatively take the form of any suitable biasing member. In their undeflected conditions (i.e., when the assembly 10 is in the braking condition illustrated in FIG. 1), the springs maintain a space of 0.007–0.010 inches between the input disks 128, 132 and the respective output disks 120, 124.

With reference to FIGS. 28–36, the actuator assembly 140 includes upper and lower plates 204, 208 having central holes 210 through which the inner hub 24 extends. The upper plate 204 also includes three tabs 212 that each extend through three corresponding slots 216 (FIGS. 6 and 8) in the housing 100 to thereby fix the upper plate 204 to the housing 100. The lower plate 208 also includes an actuator handle or arm 220 that extends out of a side slot 224 (FIG. 8) in the housing 100. The lower plate 208 may be pivoted about the inner hub 24 with respect to the upper plate 204 by actuating the handle 220. The upper and lower plates 204, 208 each include three tear-drop shaped recesses 228 that face down and up respectively. The recesses 228 of the plates 204, 208 are generally mutually aligned and in opposed facing relation to define therebetween a cavity. An actuator ball 232 (FIG. 36) is captured within each cavity.

The lower plate 208 also includes a central hub 236 that extends up through the upper plate 204, and that receives a top race of the thrust bearing 136. A lower race of the thrust bearing 136 contacts the top of the upper input disk 128. The thrust bearing 136 is slidable along the outer surface of the inner hub 24.

As shown in FIG. 1, the clutch/brake assembly 10 can be moved into a braking position. When in the braking condition, the outer portion of the lower output disk 124 is biased by the braking springs 176 against the braking surface 108 of the lower flange portion 104 of the housing 100. The frictional engagement between the lower output disk 124 and the braking surface 108 of the spring housing 100 resists rotation of the output pulley 112, which in turn stops the rotation of the cutting blades that are otherwise driven by the output pulley 112.

Also, while the clutch/brake assembly 10 is in the braking position, the input disks 128, 132 are separated from the output disks 120, 124 by the springs 196, 200. The input disks 128, 132, splined collar 72, and output shaft 20 are therefore free to rotate without being coupled to the output disks 120, 124 and the output pulley 112.

To drivingly engage the output shaft 20 with the output pulley 112, as shown in FIG. 37, the actuator handle 220 is pivoted to move the tear drop recesses 228 in the lower plate 208 out of alignment with the tear drop recesses 228 of the upper plate 204. The actuator balls 232 contacting the recesses 228 act as wedges between the plates 204, 208, and drive the lower actuator plate 208 away from the upper actuator plate 204. The separation of the lower actuator plate 208 from the upper activator plate 204 causes the thrust bearing 136 to act on the upper input disk 128 down as well. The separator and support springs 196, 200 deflect under the downward force of the actuator assembly 140.

The upper input disk 128 engages the upper output disk 120 and pushes it against the support plate 116. The support plate 116 is deflected by the force transmitted through the upper output disk 120, and permits the upper output disk 120 to move down. The upper output disk 120 is pushed against the lower input disk 132, which in turn is pressed against the lower output disk 124. The braking springs 176 are also deflected, and the lower output disk 124 is moved down out of engagement with the braking surface 108 of the housing 100.

The input and output disks 120, 124, 128, 132 are therefore sandwiched together and are coupled by friction forces for common rotation. The frictional engagement of the input and output disks 120, 124, 128, 132 drivingly connects the output shaft 20 to the output pulley 112 so that rotation of the output shaft 20 causes rotation of the output pulley 112. In this manner, the blade shafts are rotated under the power of the engine. Because there are multiple disks 120, 124, 128, 132 in the assembly 10, more power may be transferred from the output shaft 20 to the output pulley 112 than in conventional clutch/brake assemblies.

FIGS. 38–65 illustrate a second construction of a clutch brake assembly 410. Like the clutch/brake assembly 10 of FIG. 1, the output shaft 414 of the engine extends into an input shaft of the clutch/brake assembly 10, or an inner hub 418. The outer surface of the inner hub 418 is stamped to provide an indent or key 422 that extends inwardly of the inner hub 418. The keyway of the output shaft 414 engages the key 422 to afford common rotation of the output shaft 414 with the inner hub 418. The distal end of the output shaft 414 includes a threaded bore 426. The output shaft 414 is tightened against an inner shoulder 430 in the inner hub 418 by a bolt 434 that is threaded into the threaded bore 426. The head of the bolt 434 bears against the bottom surface of the inner hub 418.

As shown in FIGS. 38–41, an output device in the form of a transaxle pulley 438 is welded to the outer surface of the inner hub 418, and rotates in common with the inner hub 418 and the output shaft 414. The transaxle pulley 438 engages a drive belt 442 that is operably driven by the transmission (not shown) of the riding lawnmower or other power equipment to which the engine is mounted.

Figure 61:
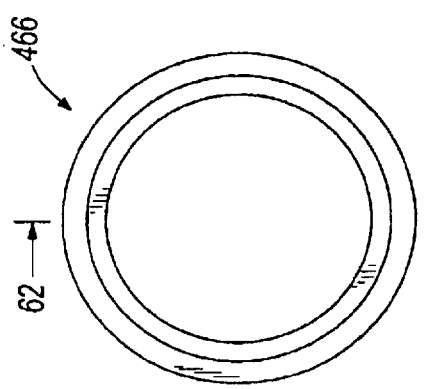
FIG. 61 is a top view of a washer of the assembly of FIG. 38.
Figure 62:
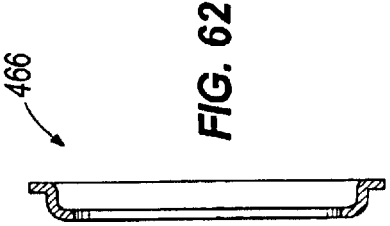
FIG. 62 is a cross-sectional view of the washer of FIG. 61 taken along line 62—62.

The inner hub 418 also includes a downwardly-facing outer shoulder 446 and a threaded lower end 450. Between the outer shoulder 446 and the threaded lower end 450 are upper and lower bearings 454, 458, a splined collar 462 (FIGS. 51–52), and a cup-shaped washer 466 (FIGS. 61–62). The upper and lower bearings 454, 458 each include an inner race 470 and an outer race 474 separated by balls 478, and the splined collar 462 includes an outer portion that has splines 482. A nut 486 is threaded onto the threaded lower end 450 of the inner hub 418 to capture the splined collar 462 and the cup-shaped washer 466 between the inner races 470 of the upper and lower bearings 454, 458. Tightening the nut 486 causes a frictional engagement between the inner races 470 of the upper and lower bearings 454, 458, the splined collar 462, the cup-shaped washer 466, and the inner hub 418, such that those components rotate in common.

Figure 64:
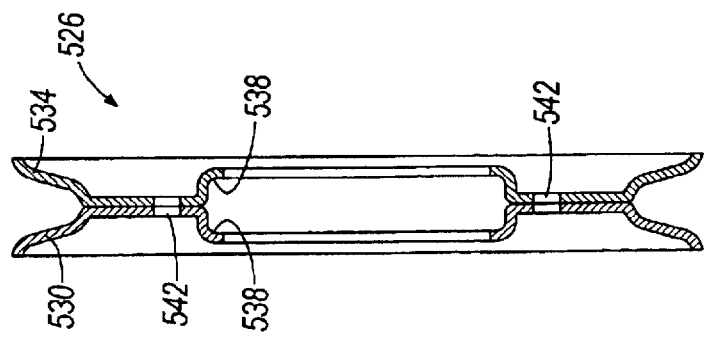
FIG. 64 is a cross-sectional view of the pulley halves of FIG. 63 taken along line 64—64.
Figure 63:
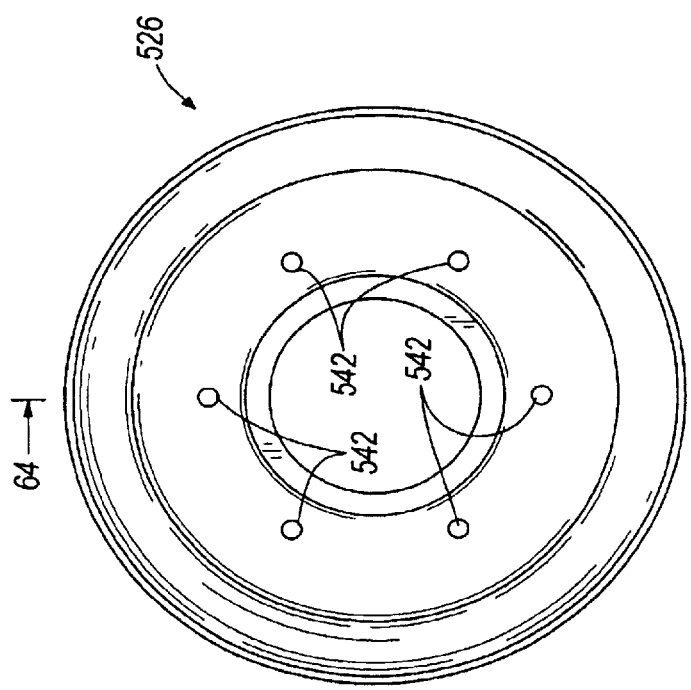
FIG. 63 is a top view of two mated pulley halves of the assembly of FIG. 38.

A first housing shell in the form of a housing 490 (FIGS. 42–43) is affixed to the outer race 474 of the upper bearing 454. The housing 490 extends radially from the upper bearing 454, and includes an outer lip 494 that defines a first braking surface in the form of a downwardly-facing braking surface 498. Below the housing 490 is an actuator assembly 502, a thrust bearing 506, upper and lower input disks 510, 514 (FIGS. 53–54), a brake disk 518 (FIGS. 55–57), a second housing shell in the form of an output disk 522 (FIGS. 58–60), and an output device in the form of an output pulley 526 (FIGS. 63–64).

The output pulley 526 is split into an upper pulley half 530 and a lower pulley half 534. The pulley halves 530, 534 each include a recess 538 therein to support the lower bearing 458 such that the lower bearing 458 is sandwiched between the pulley halves 530, 534 when the pulley halves 530, 534 are connected. The pulley halves 530, 534 each include three equally spaced apertures 542 to pass fasteners 546 therethrough to connect the pulley halves 530, 534 and sandwich the lower bearing 458. Like the clutch/brake assembly 10, the output pulley 526 receives a drive belt 550 which interconnects with pulleys (not shown) operable to drive working shafts, such as blade shafts (also not shown) having cutting blades attached thereto.

The output disk 522 includes three equally spaced apertures 554 that generally align with the apertures 542 of the pulley halves 530, 534. The fasteners 546 pass through the apertures 542 in the pulley halves 530, 534 and the output disk 522 to interconnect the output pulley 526 and the output disk 522 for co-rotation. The output disk 522 (FIGS. 58–60) defines an inner lip 558 and an outer lip 562, with the three equally spaced apertures 554 being positioned around the inner lip 558 for interconnection with the output pulley 526. Alternatively, the upper pulley half 530 may be permanently attached to the inner lip 558 via other suitable methods, such as welding, brazing, or integrally forming. The outer lip 562 includes multiple raised portions in the form of protuberances 566 and raised portions 570 around the output disk 522.

The upper and lower input disks 510, 514 are interconnected to the splined collar 462 by virtue of the splines 482. The splined interconnection causes the input disks 510, 514 to be rotationally fixed relative to the splined collar 462, but affords axial movement of the input disks 510, 514 along the splines 482. A second biasing member in the form of a separator spring 574 is interposed between the input disks 510, 514 to maintain separation therebetween, and a third biasing member in the form of a support spring 578 is interposed between the cup-shaped washer 466 and the lower input disk 514 to support the input disks 510, 514. The separator spring 574 and support spring 578 are preferably wave springs, but may alternatively take the form of any suitable biasing member.

Figure 38:
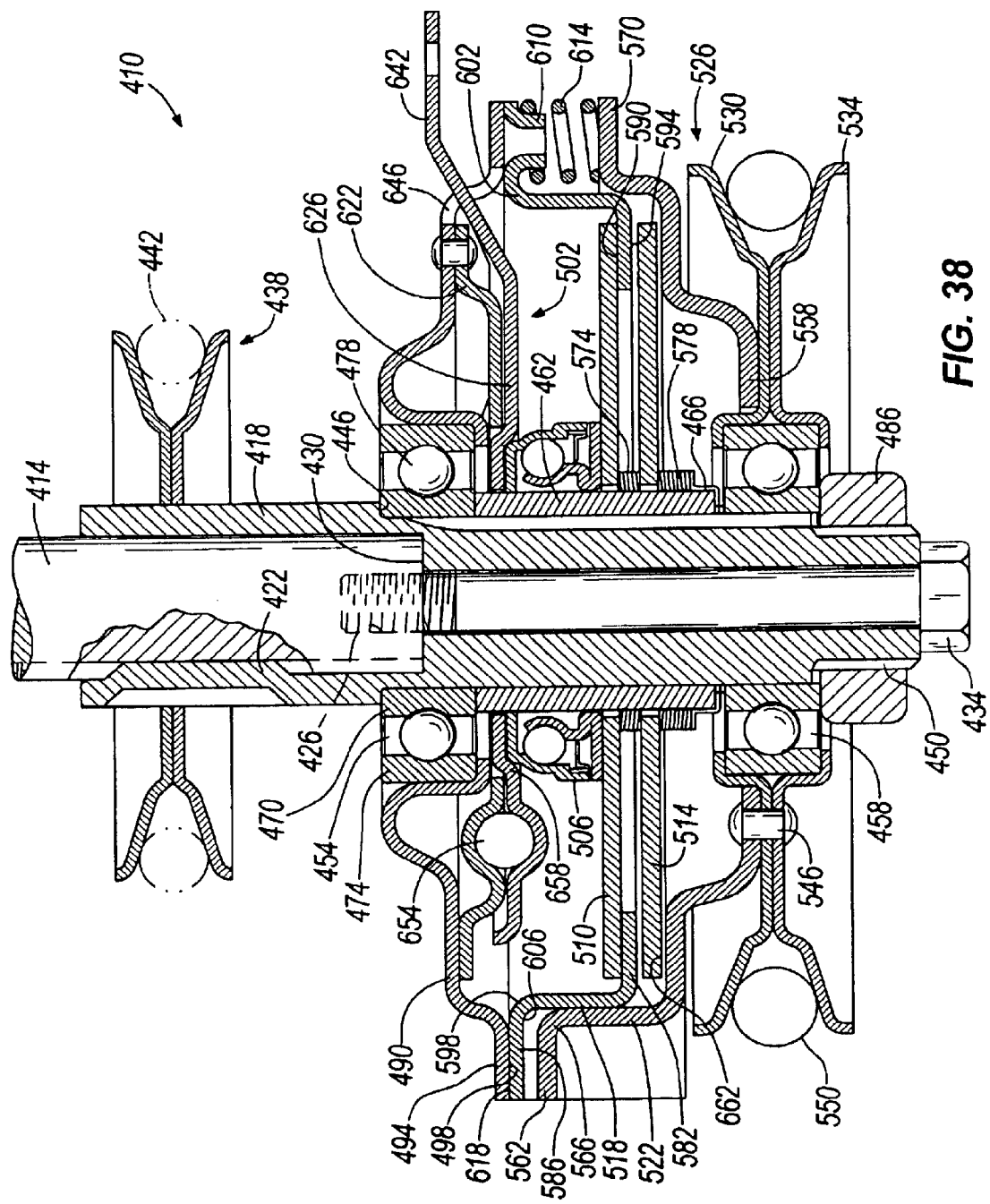
FIG. 38 is a cross-sectional view of another construction of a clutch/brake assembly in a braking position.
Figure 39:
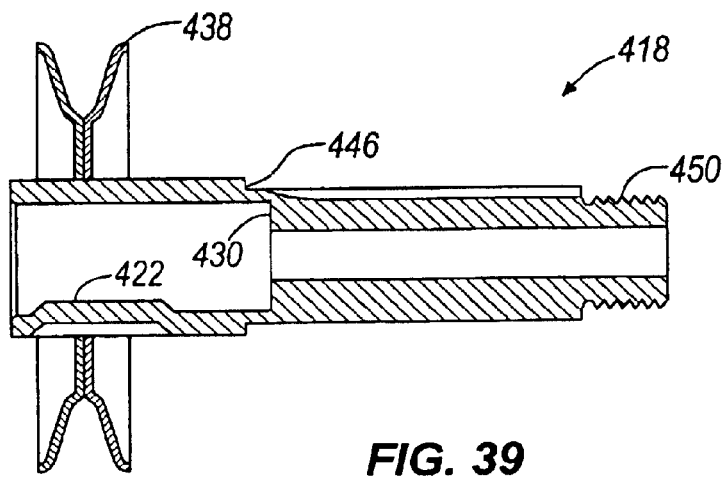
FIG. 39 is a cross-sectional view of the inner hub and transaxle pulley portion of the assembly of FIG. 38 taken along line 39—39.
Figure 40:
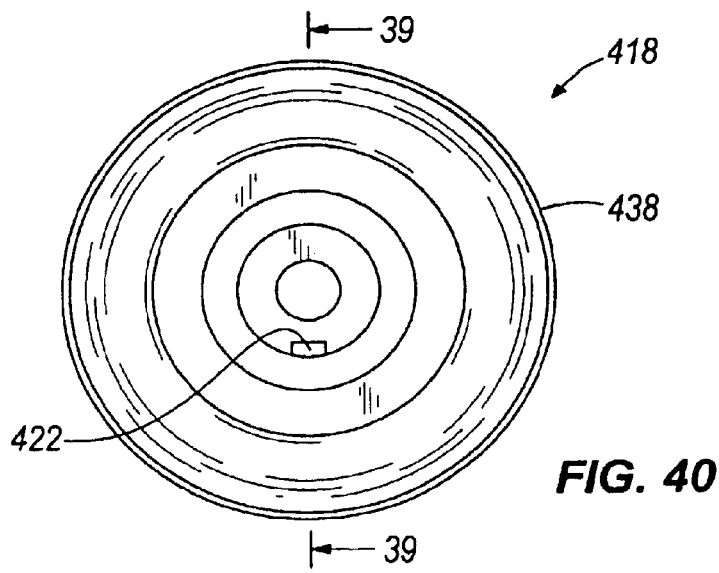
FIG. 40 is a left end view of the inner hub and transaxle pulley portion of the assembly of FIG. 38.
Figure 41:
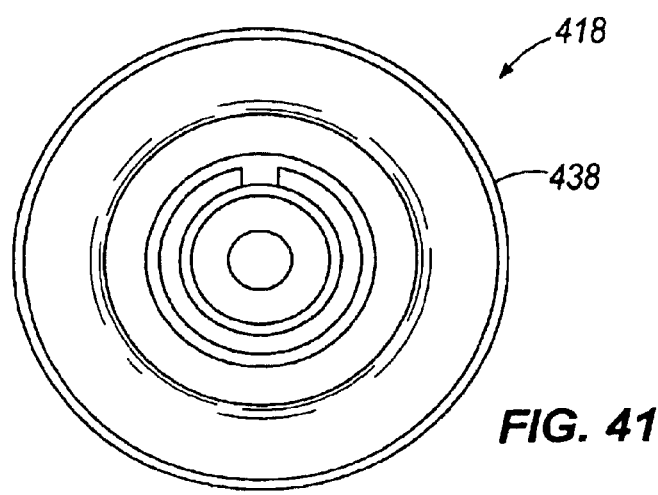
FIG. 41 is a right end view of the inner hub and transaxle pulley portion of the assembly of FIG. 38.
Figure 46:
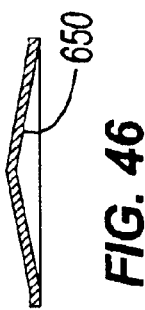
FIG. 46 is a cross-sectional view of the top plate of FIG. 44 taken along line 46—46.
Figure 45:
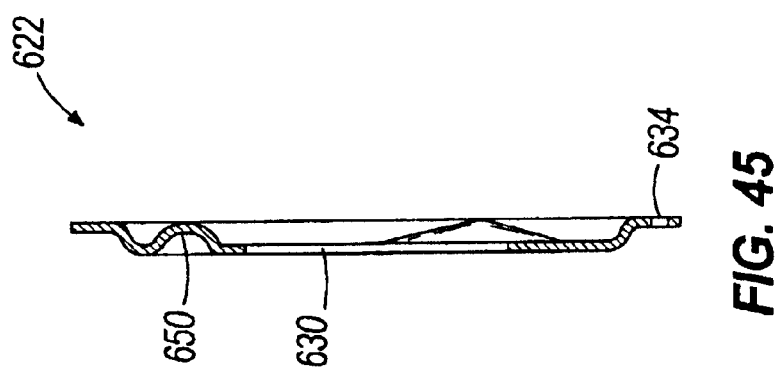
FIG. 45 is a cross-sectional view of the top plate of FIG. 44 taken along line 45—45.
Figure 44:
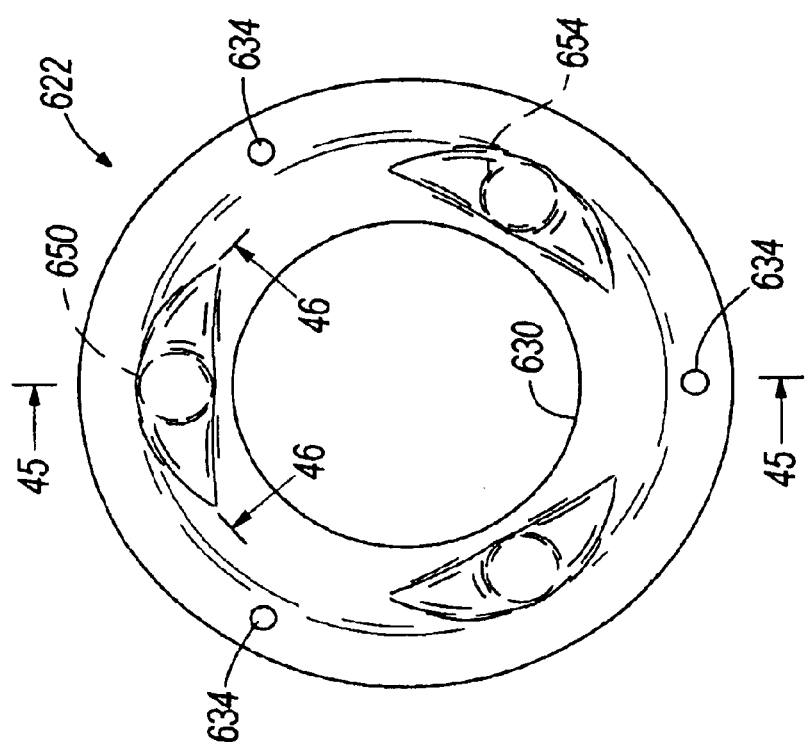
FIG. 44 is a top view of a top plate of the assembly of FIG. 38.
Figure 51:
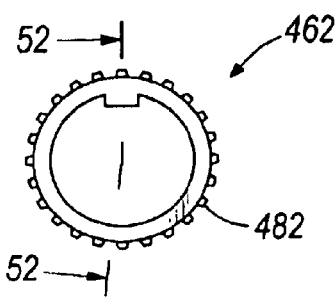
FIG. 51 is an end view of a splined collar of the assembly of FIG. 38.
Figure 52:
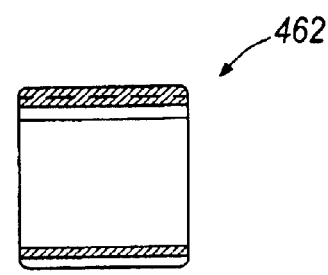
FIG. 52 is a cross-sectional view of the splined collar of FIG. 51 taken along line 52—52.
Figure 53:
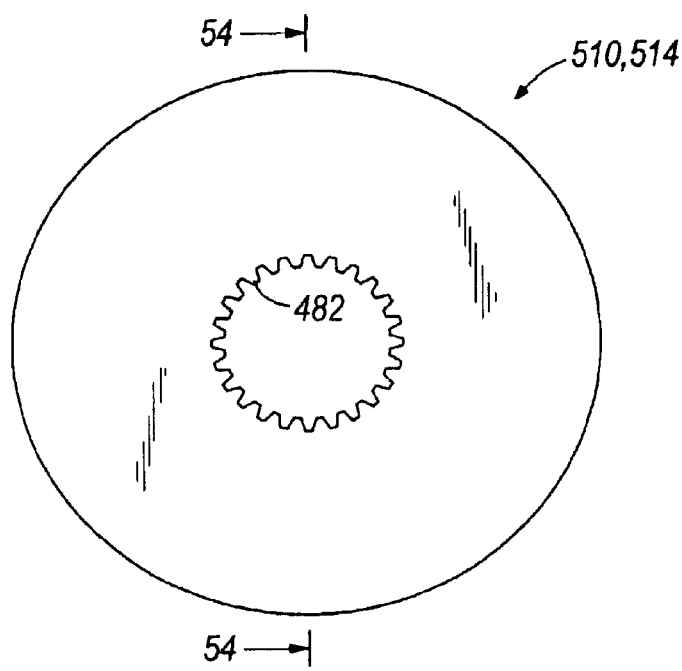
FIG. 53 is a top view of an input disk of the assembly of FIG. 38.
Figure 54:
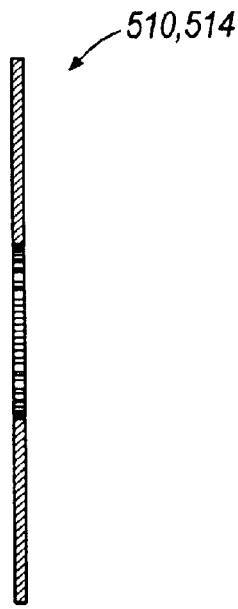
FIG. 54 is a cross-sectional view of the input disk of FIG. 53 taken along line 54—54.
Figure 55:
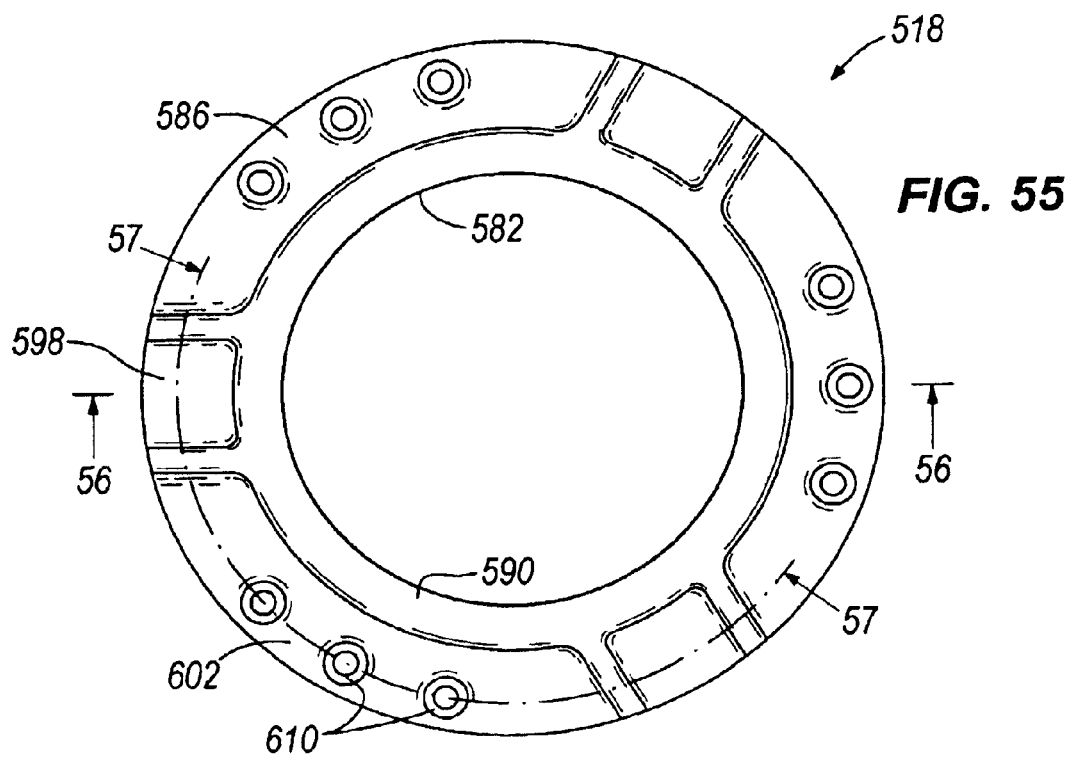
FIG. 55 is a top view of a brake disk of the assembly of FIG. 38.
Figure 56:
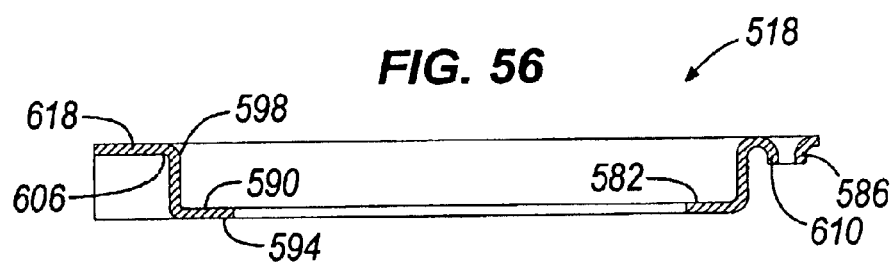
FIG. 56 is a cross-sectional view of the brake disk of FIG. 55 taken along line 56—56.
Figure 57:
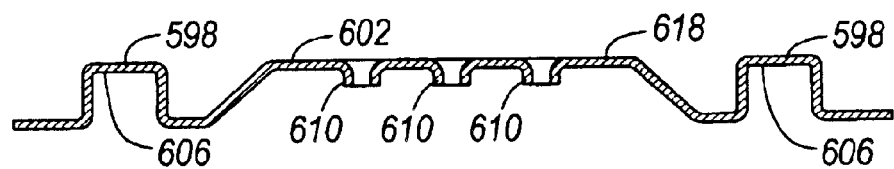
FIG. 57 is a rolled-out edge view of the brake disk of FIG. 55 taken along line 57—57.
Figure 58:
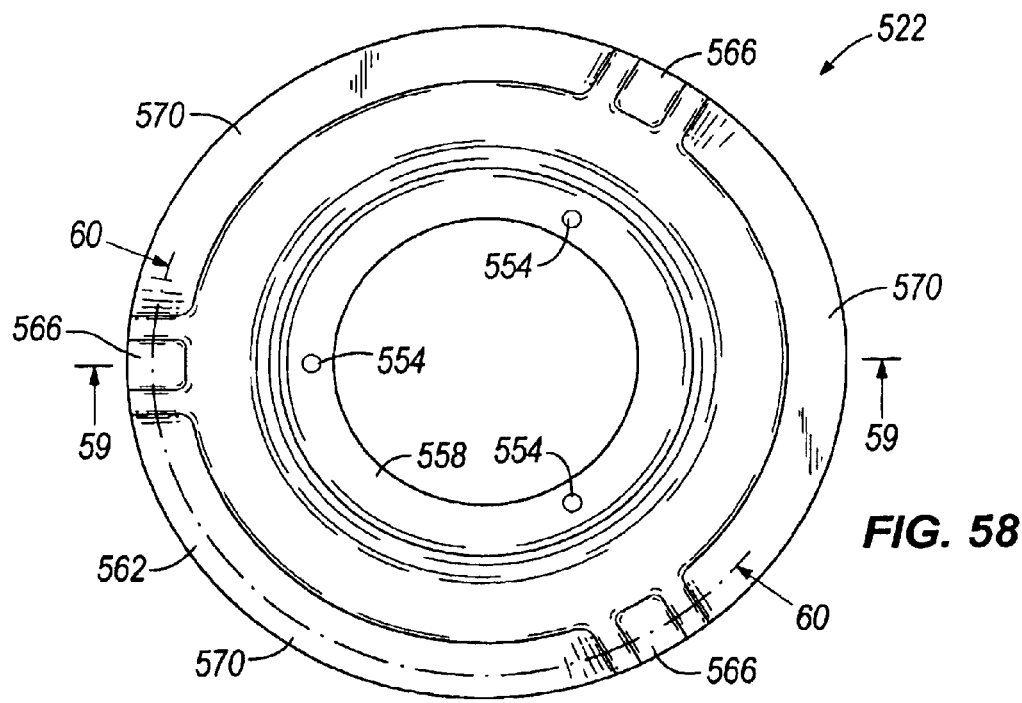
FIG. 58 is a top view of an output disk of the assembly of FIG. 38.
Figure 59:
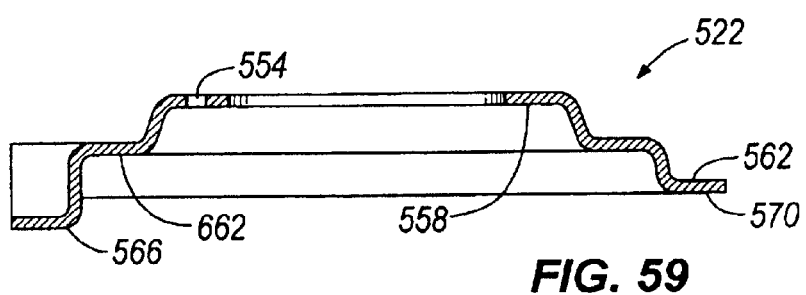
FIG. 59 is a cross-sectional view of the output disk of FIG. 58 taken along line 59—59.
Figure 60:
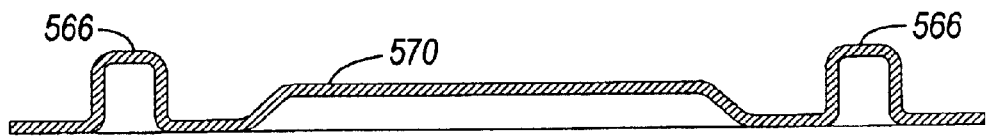
FIG. 60 is a rolled-out edge view of the output disk of FIG. 58 taken along line 60—60.

The brake disk 518 (FIGS. 55–57) defines an inner lip 582 and an outer lip 586. As shown in FIG. 38, the brake disk 518 is positioned relative to the output disk 522 and input disks 510, 514 such that the inner lip 582 is disposed between the input disks 510, 514. The inner lip 582 defines a first friction surface and a second friction surface, which are shown as an upper friction surface 590 and a lower friction surface 594, respectively, in the construction shown in FIG. 38. The upper friction surface 590 is engageable with the upper S input disk 510 and the lower friction surface 594 is engageable with the lower input disk 514. The outer lip 586 includes multiple raised portions in the form of protuberances 598 and raised portions 602 around the brake disk 518. In the assembly 410, the protuberances 566 of the output disk 522 are insertable into recesses 606 defined on the underside of the protuberances 598 of the brake disk 518. Upon interconnection of the protuberances 566 into the recesses 606, the brake disk 518 and the output disk 522 are coupled for co-rotation.

The outer lip 586 also includes multiple spring perches 610 positioned on the raised portions 602 of the brake disk 518. Each raised portion 602 includes three spring perches 610, with each spring perch 610 adapted to receive one end of a biasing member in the form of a coil spring 614. As shown in FIG. 38, the coil springs 614 are supported between the outer lip 586 of the brake disk 518 and the outer lip 562 of the output disk 522 on their respective raised portions 602, 570. The outer lip 586 of the brake disk 518 further defines a second braking surface in the form of an upwardly-facing braking surface 618. The braking surface 618 is a combination of the uppermost surfaces defined by the protuberances 598 and the raised portions 602. The coil springs 614 resiliently bias the brake disk 518 axially away from the output disk 522 and toward the housing 490, such that the braking surface 498 of the housing 490 frictionally engages the braking surface 618 of the brake disk 518. The coil springs 614 are sizeable and arrangeable on the brake disk 518 to provide a pre-determined axial force to the brake disk 518 against the housing 490. The stiffness and quantity of the springs 614 may be varied to affect the axial force to the brake disk 518 against the housing 490. This axial force is directly proportional to the braking force generated between the braking surfaces 498, 618, so varying the axial force subsequently yields a varying braking force.

With reference to FIGS. 44–50, the actuator assembly 502 includes a reaction disk and an actuator disk in the form of upper and lower plates 622, 626, respectively, having central holes 630 through which the inner hub 418 extends. The upper plate 622 (FIGS. 44–46) includes three apertures 634 correlating with apertures 638 in the housing 490 for interconnection with the housing 490, thereby fixing the upper plate 622 relative to the housing 490. The lower plate 626 (FIGS. 47–50) includes an actuator handle 642 that extends out of a side slot 646 (FIG. 42) in the housing 490. The lower plate 626 may be pivoted about the inner hub 418 with respect to the upper plate 622 by actuating the handle 642. The upper and lower plates 622, 626 each include three recesses 650. In the actuator assembly 502, the recesses 650 of the plates 622, 626 are generally mutually aligned and in opposed facing relation to define a cavity there between. An actuator ball 654 (FIGS. 44 and 47) is captured within each cavity. The recesses 650 are symmetrical about an axis extending radially from the center of the plates 622, 626 and passing through the widest portion of the recesses 650 and the center of the plates 622, 626. The recesses 650 also taper from their widest portion to their respective ends. The shape of the recesses 650 allows the plates 622, 626 to be oriented relative to the housing 490 in multiple configurations, therefore allowing operation of the assembly 502 when actuating the handle 642 either in a clockwise or counter-clockwise direction relative to the housing 490. This provides increased flexibility when mounting the clutch/brake assembly 410 into the powered implement or vehicle.

The lower plate 626 also includes a central hub 658 that extends up through the upper plate 622, and that receives a top race of the thrust bearing 506. The lower race of the thrust bearing 506 contacts the top of the upper input disk 510. The thrust bearing 506 is slidable along the outer surface of the inner hub 418. The thrust bearing 506 is operable to apply an axial force to the input disks 510, 514 against the bias of the springs 574, 578.

Figure 65:
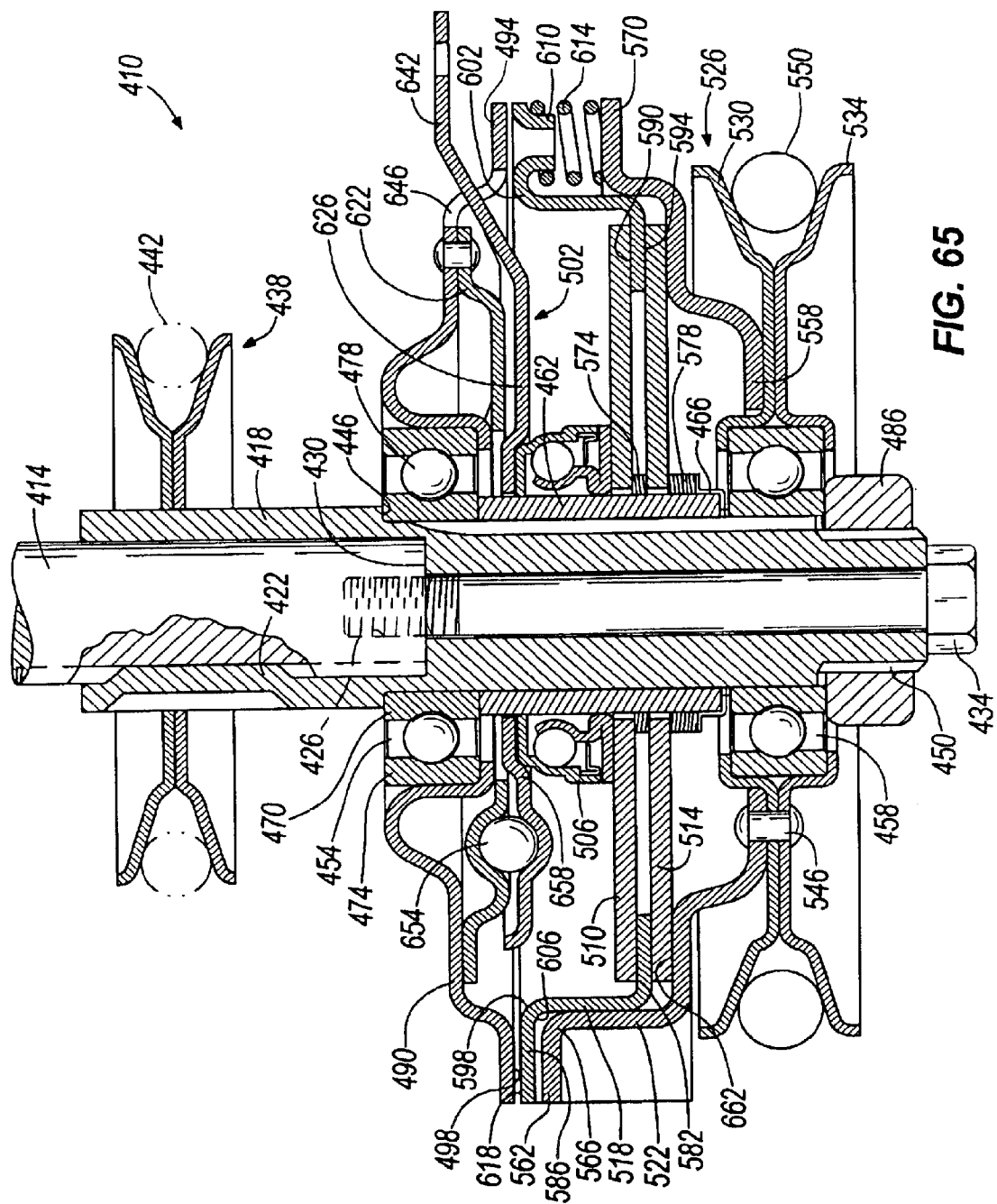
FIG. 65 is a cross-sectional view of the clutch/brake assembly of FIG. 38 in a driving position.

As shown in FIGS. 38 and 65, the clutch/brake assembly 410 is operable between a braking position and a driving position. When in the braking position, the outer lip 586 of the brake disk 518 is biased by the coil springs 614 against the outer lip 494 of the housing 490, thus frictionally engaging the braking surfaces 618, 498 of the brake disk 518 and the housing 490. As a result, relative rotation between the housing 490 and the brake disk 518 is resisted. Since the brake disk 518 is interconnected for co-rotation with the output disk 522, and the output disk 522 is fastened to the output pulley 526, rotation of the output pulley 526 is also resisted, which in turn stops the rotation of the cutting blades or other implements that are driven by the output pulley 526.

Also, while the clutch/brake assembly 410 is in the braking position, the input disks 510, 514 are separated from the inner lip 582 of the brake disk 518 and the output disk 522 by the springs 574, 578. The input disks 510, 514, splined collar 462, and output shaft 414 are therefore free to rotate without being coupled to the brake disk 518, output disk 522, and the output pulley 526.

To drivingly engage the output shaft 414 with the output pulley 526, as shown in FIG. 65, the actuator handle 642 is pivoted to move the recesses 650 in the lower plate 626 out of alignment with the recesses 650 of the upper plate 622. The actuator balls 654 within the cavity defined by the opposing recesses 650 act as wedges between the plates 622, 626, and move the lower plate 626 away from the upper plate 622. The separation of the lower plate 626 from the upper plate 622 causes the thrust bearing 506 to downwardly act on the upper input disk 510. In turn, the separator and support springs 574, 578 deflect under the downward movement of the upper input disk 510.

The upper input disk 510 engages the upper friction surface 590 of the inner lip 582 of the brake disk 518 and pushes it downward against the lower input disk 514, causing the lower friction surface 594 to engage the driven lower input disk 514. Further downward movement of the input disks 510, 514 causes the lower input disk 514 to drivingly engage a third friction surface 662 on the output disk 522, which is shown as an upper friction surface 662 on the output disk 522 in the construction shown in FIG. 38. The upper friction surface 662 is radially between the inner lip 558 and the outer lip 562 of the output disk 522. The coil springs 614 are deflected upon downward movement of the brake disk 518, and the braking surfaces 618, 498 of the brake disk 518 and the housing 490 are moved out of frictional engagement.

The input disks 510, 514, inner lip 582 of the brake disk 518, and the output disk 522 are therefore sandwiched together and coupled by frictional forces for common rotation. The frictional engagement of the input disks 510, 514, inner lip 582 of the brake disk 518, and the output disk 522 drivingly connects the output shaft 414 to the output pulley 526 so that rotation of the output shaft 414 causes rotation of the output pulley 526. In this manner, like the clutch/brake assembly 10, the blade shafts that are interconnected with the output pulley 526 are rotated under the power of the engine. Also, the multiple input disks 510, 514 and friction surfaces 590, 594 of the brake disk 518 and output disk 522 allow more power to be transferred from the output shaft 414 to the output pulley 526 compared to conventional clutch/brake assemblies.

While only two constructions of the invention have been illustrated and described, it is not intended to be limited thereby, but only by the scope of the appended claims.

I claim:

1. A clutch/brake assembly comprising:
   a first housing shell having a braking surface;
   an input shaft coupled to the first housing shell for rotation relative to the first housing shell;
   at least two input disks coupled to the input shaft for co-rotation with the shaft, the input disks being movable along the shaft;
   a braking disk having a first friction surface and a second friction surface, the braking disk being movable along the shaft;
   a biasing member biasing the braking disk against the braking surface of the first housing shell such that the braking disk resists rotation relative to the first housing shell;
   a second housing shell coupled to the input shaft for rotation relative to the input shaft and the first housing shell, the second housing shell having a third friction surface; and
   an actuator assembly operable to disengage the braking disk from the braking surface and operable to drivingly engage the first, second, and third friction surfaces with the input disks.

2. The clutch/brake assembly of claim 1, wherein the input disks couple to the input shaft via a splined connection.

3. The clutch/brake assembly of claim 1, further comprising an output device coupled to the input shaft for rotation with the input shaft.

4. The clutch/brake assembly of claim 3, wherein the output device is a pulley.

5. The clutch/brake assembly of claim 3, wherein the output device is coupled to the input shaft via a key and keyway connection.

6. The clutch/brake assembly of claim 1, further comprising an output device coupled to the input shaft for rotation relative to the input shaft.

7. The clutch/brake assembly of claim 6, wherein the output device is a pulley.

8. The clutch/brake assembly of claim 6, wherein the output device is coupled to the second housing shell for rotation with the second housing shell.

9. The clutch/brake assembly of claim 8, wherein the output device is fastened to the second housing shell.

10. The clutch/brake assembly of claim 1, wherein the biasing member is a spring, the spring being supported between the braking disk and the second housing shell.

11. The clutch/brake assembly of claim 1, further comprising:
    a second biasing member biasing the input disks away from the third friction surface; and
    a third biasing member biasing the input disks away from the first and the second friction surfaces.

12. The clutch/brake assembly of claim 1, wherein the first friction surface is drivingly engaged by one of the at least two input disks, and the second friction surface is drivingly engaged by the other of the at least two input disks.

13. The clutch/brake assembly of claim 1, wherein the actuator assembly includes
    an actuator disk having a first tapered groove therein;
    a reaction disk coupled to the first housing shell and having a second tapered groove therein, the actuator disk and reaction disk being positioned in a facing relationship such that the first and the second grooves define a space between the actuator disk and the reaction disk upon coupling the actuator disk and the reaction disk;
    a handle coupled to the actuator disk and operable to rotate the actuator disk relative to the reaction disk; and
    a ball positioned in the space and supported by the first and second grooves.

14. The clutch/brake assembly of claim 13, wherein the reaction disk is oriented in a first position relative to the first housing shell, and wherein the actuator disk is rotatable in a first direction relative to the reaction disk to misalign the first and the second grooves and axially separate the actuator disk and the reaction disk.

15. The clutch/brake assembly of claim 14, wherein the reaction disk is oriented in a second position relative to the first housing shell, and wherein the actuator disk is rotatable in a second direction relative to the reaction disk to misalign the first and the second grooves and axially separate the actuator disk and the reaction disk.

16. The clutch/brake assembly of claim 1, wherein the braking disk includes a second braking surface to frictionally engage the braking surface of the first housing shell to resist rotation of the braking disk relative to the first housing shell.

17. A clutch/brake assembly comprising:
    a first housing shell having a braking surface;

an input shaft coupled to the first housing shell for rotation relative to the first housing shell;

a second housing shell coupled to the input shaft for rotation relative to the input shaft and the first housing shell;

at least two input disks coupled to the input shaft for co-rotation with the input shaft, the input disks being movable along the input shaft between a braking position and a driving position;

a braking disk coupled to the second housing shell for co-rotation with the second housing shell, the braking disk being movable along the input shaft between the braking position and the driving position;

a biasing member biasing the braking disk against the braking surface of the first housing shell such that the braking disk resists rotation relative to the first housing shell when the braking disk is in the braking position; and an actuator assembly operable to disengage the braking disk from the braking surface of the first housing shell and engage the input disks with the braking disk into the driving position for co-rotation therebetween.

18. The clutch/brake assembly of claim 17, wherein the input disks couple to the input shaft via a splined connection.

19. The clutch/brake assembly of claim 17, wherein the at least two input disks sandwich the braking disk when in the driving position.

20. The clutch/brake assembly of claim 17, further comprising an output device coupled to the input shaft for rotation with the input shaft.

21. The clutch/brake assembly of claim 20, wherein the output device is a pulley.

22. The clutch/brake assembly of claim 20, wherein the output device is coupled to the input shaft via a key and keyway connection.

23. The clutch/brake assembly of claim 17, further comprising an output device coupled to the input shaft for rotation relative to the input shaft.

24. The clutch/brake assembly of claim 23, wherein the output device is a pulley.

25. The clutch/brake assembly of claim 23, wherein the output device is coupled to the second housing shell for rotation with the second housing shell.

26. The clutch/brake assembly of claim 17, wherein the braking disk is inter-engaged with the second housing shell.

27. The clutch/brake assembly of claim 26, wherein the braking disk includes a first raised portion and a first recess defined on an underside of the first raised portion, wherein the second housing shell includes a second raised portion, and wherein the braking disk inter-engages the second housing shell via the second raised portion being inserted into the first recess.

28. The clutch/brake assembly of claim 17, wherein the biasing member is a spring, the spring biasing the braking disk into the braking position.

29. The clutch/brake assembly of claim 17, further comprising:

a second biasing member biasing the input disks into the braking position; and a third biasing member biasing the input disks into the braking position;

wherein the second biasing member supports at least one of the input disks, and wherein the third biasing member supports all of the input disks.

30. The clutch/brake assembly of claim 17, wherein the actuator assembly includes an actuator disk having a first tapered groove therein;

a reaction disk coupled to the first housing shell and having a second tapered groove therein, the actuator disk and reaction disk being positioned in a facing relationship such that the first and the second grooves define a space between the actuator disk and the reaction disk upon coupling the actuator disk and the reaction disk;

a handle coupled to the actuator disk and operable to rotate the actuator disk relative to the reaction disk between the braking and driving positions; and a ball positioned in the space and supported by the first and second grooves.

31. The clutch/brake assembly of claim 30, wherein the reaction disk is oriented in a first position relative to the first housing shell, and wherein the actuator disk is rotatable in a first direction relative to the reaction disk to cause the input disks to axially move into the driving position.

32. The clutch/brake assembly of claim 30, wherein the reaction disk is oriented in a first position relative to the first housing shell, and wherein the actuator disk is rotatable in a second direction relative to the reaction disk to cause the input disks to axially move into the driving position.

33. The clutch/brake assembly of claim 30, wherein, in a first configuration of the clutch/brake assembly, the actuator disk is rotatable in a first direction relative to the reaction disk to cause the input disks to axially move into the driving position, and in a second direction relative to the reaction disk to cause the input disks to axially move into the braking position.

34. The clutch/brake assembly of claim 33, wherein, in a second configuration of the clutch/brake assembly, the actuator disk is rotatable in the first direction relative to the reaction disk to cause the input disks to axially move into the braking position, and in the second direction relative to the reaction disk to cause the input disks to axially move into the driving position.

35. A clutch/brake assembly comprising:

a first housing shell having a first braking surface;

an input shaft coupled to the first housing shell for rotation relative to the first housing shell;

a first output device coupled to the input shaft for rotation with the input shaft;

a second output device coupled to the input shaft for rotation relative to the input shaft;

at least two input disks coupled to the input shaft for co-rotation therewith, the input disks being axially movable along the input shaft;

a braking disk having
  a second braking surface engageable with the first braking surface,
  a first friction surface, and
  a second friction surface opposite the first friction surface, the braking disk being movable along the input shaft;

a second housing shell coupled to the input shaft for rotation relative to the input shaft and the first housing shell, the second housing shell inter-engaging the braking disk for co-rotation therewith, the second housing shell having a third friction surface;

a biasing member biasing the second braking surface against the first braking surface such that the braking disk resists rotation relative to the first housing shell; and an actuator assembly operable to overcome the biasing member to disengage the first braking surface from the second braking surface and drivingly engage the first, second, and third friction surfaces with the input disks to cause rotation of the second housing shell and the second output device.

36. The clutch/brake assembly of claim 35, wherein the braking disk includes a first raised portion and a first recess defined on an underside of the first raised portion, wherein the second housing shell includes a second raised portion, and wherein the braking disk inter-engages the second housing shell via the second raised portion being inserted into the first recess.

37. The clutch/brake assembly of claim 36, wherein the braking disk and the second housing shell are stamped from sheet steel.

38. The clutch/brake assembly of claim 35, wherein the actuator assembly includes
- an actuator disk having a first tapered groove therein;
- a reaction disk coupled to the first housing shell and having a second tapered groove therein, the actuator disk and reaction disk being positioned in a facing relationship such that the first and the second grooves define a space between the actuator disk and the reaction disk upon coupling the actuator disk and the reaction disk;
- a handle coupled to the actuator disk and operable to rotate the actuator disk relative to the reaction disk between the braking and driving positions; and
- a ball positioned in the space and supported by the first and second grooves.

39. The clutch/brake assembly of claim 38, wherein the reaction disk is oriented in a first position relative to the first housing shell, and wherein the actuator disk is rotatable in a first direction relative to the reaction disk to misalign the first and the second grooves and axially separate the actuator disk and the reaction disk to cause the input disks to drivingly engage the first, second, and third friction surfaces.

40. The clutch/brake assembly of claim 39, wherein the reaction disk is oriented in a second position relative to the first housing shell, and wherein the actuator disk is rotatable in a second direction relative to the reaction disk to misalign the first and the second grooves and axially separate the actuator disk and the reaction disk to cause the input disks to drivingly engage the first, second, and third friction surfaces.

41. The clutch/brake assembly of claim 35, wherein the biasing member includes a coil spring radially supported by a spring perch, the spring perch being defined on the braking disk.

42. The clutch/brake assembly of claim 41, wherein a plurality of spring perches are defined around the braking disk.

43. A clutch/brake assembly comprising:
- a housing having a first braking surface;
- an input shaft coupled to the housing for rotation relative to the housing;
- at least two input disks coupled to the input shaft for co-rotation with the shaft, the input disks being movable along the shaft;
- a braking disk having a second braking surface, the braking disk being movable along the shaft;
- a biasing member biasing the second braking surface against the first braking surface such that the braking disk resists rotation relative to the housing;
- an output disk coupled to the input shaft for rotation relative to the input shaft and the housing, at least one of the input disks being engageable with the output disk; and
- an actuator assembly operable to disengage the first and second braking surfaces and operable to drivingly engage the at least one input disk with the output disk.

44. The clutch/brake assembly of claim 43, wherein the braking disk is coupled to the output disk for co-rotation with the output disk.

45. The clutch/brake assembly of claim 43, wherein the braking disk includes a first friction surface and a second friction surface, and wherein the input disks are engageable with the first and second surfaces.

* * * * *